US008595366B2

(12) United States Patent
Mukundan et al.

(10) Patent No.: US 8,595,366 B2
(45) Date of Patent: Nov. 26, 2013

(54) METHOD AND SYSTEM FOR DYNAMICALLY CREATING AND SERVICING MASTER-SLAVE PAIRS WITHIN AND ACROSS SWITCH FABRICS OF A PORTABLE COMPUTING DEVICE

(75) Inventors: Purandar Mukundan, Boulder, CO (US); Brian J. Salsbery, Boulder, CO (US); Norman S. Gargash, Boulder, CO (US); Robert N. Gibson, Boulder, CO (US); Sean D. Sweeney, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 13/101,937

(22) Filed: May 5, 2011

(65) Prior Publication Data

US 2012/0284354 A1 Nov. 8, 2012

(51) Int. Cl.
*G06F 15/16* (2006.01)

(52) U.S. Cl.
USPC ........................................................ 709/227

(58) Field of Classification Search
USPC ........................................................ 709/227
See application file for complete search history.

(56) References Cited

U.S. PATENT DOCUMENTS

| | | | |
|---|---|---|---|
| 6,507,583 B1 | 1/2003 | Beasley | |
| 6,570,849 B1 * | 5/2003 | Skemer et al. | 370/230.1 |
| RE38,428 E | 2/2004 | Kelly et al. | |
| 6,920,171 B2 * | 7/2005 | Souissi et al. | 375/133 |
| 7,028,096 B1 * | 4/2006 | Lee | 709/231 |
| 7,188,202 B1 | 3/2007 | Dorr et al. | |
| 7,283,579 B2 * | 10/2007 | Higgins, Jr. | 375/133 |
| 7,623,524 B2 | 11/2009 | Muthukrishnan et al. | |
| 7,773,591 B2 * | 8/2010 | Tsang et al. | 370/379 |
| 2002/0116481 A1 * | 8/2002 | Lee | 709/220 |
| 2003/0208572 A1 | 11/2003 | Shah et al. | |
| 2005/0091432 A1 | 4/2005 | Adams et al. | |
| 2009/0259736 A1 * | 10/2009 | Chang et al. | 709/221 |
| 2009/0307408 A1 | 12/2009 | Naylor | |
| 2010/0005213 A1 | 1/2010 | Butter et al. | |
| 2010/0115167 A1 * | 5/2010 | Tardieux et al. | 710/240 |
| 2012/0297106 A1 * | 11/2012 | Gibson et al. | 710/309 |

OTHER PUBLICATIONS

International Search Report and Written Opinion—PCT/US2012/035847—ISA/EPO—Nov. 19, 2012.

* cited by examiner

*Primary Examiner* — Alicia Baturay
(74) *Attorney, Agent, or Firm* — Nicholas A. Cole

(57) ABSTRACT

A method and system for dynamically creating and servicing master-slave pairs within and across switch fabrics of a portable computing device ("PCD") are described. The system and method includes receiving a client request comprising a master-slave pair and conducting a search for a slave corresponding to the master-slave pair. A route for communications within and across switch fabrics is created and that corresponds to the master-slave pair. One or more handles or arrays may be stored in a memory device that correspond to the created route. Next, bandwidth across the route may be set. After the bandwidth across the newly created route is set, the client request originating the master-slave pair may be serviced using the created route. Conducting the search for the slave may include comparing unique identifiers assigned to each slave in a master-slave hierarchy. The search within and across switch fabrics may also include reviewing a fabric route check table for slaves that can be interrogated within a switch fabric.

32 Claims, 19 Drawing Sheets

REQUEST TYPE(S)

TYPE 2 - "CPU STYLE" REQUEST(S)

Ib = THROUGHPUT BANDWIDTH OF CPU

Ab = THROUGHPUT X Z%

Z = CASHE MISS %, USAGE %, ETC.

FIG. 9B

METHOD AND SYSTEM FOR DYNAMICALLY CREATING AND SERVICING MASTER-SLAVE PAIRS WITHIN AND ACROSS SWITCH FABRICS OF A PORTABLE COMPUTING DEVICE

DESCRIPTION OF THE RELATED ART

Portable computing devices ("PCDs") are becoming necessities for people on personal and professional levels. These devices may include cellular telephones, portable/personal digital assistants ("PDAs"), portable game consoles, portable navigation units, palmtop computers, and other portable electronic devices.

PCDs may run various types of software for providing various functions and features. For example, PCDs may run entertainment software which may provide functions such as watching videos and playing video games. PCDs may also support other types of software such as business software or writing software, such as spreadsheets, e-mail, and/or word processing software.

Usually, the software described above running on a PCD requires actions from various hardware that are linked together as master-slave pairs. For example, a master-slave-pair may include a mobile display processor acting as a master that issues commands to a slave such as an external bus interface. In conventional PCDs, the relationships between master-slave pairs are usually static and are established prior to runtime when a PCD starts executing the software described above.

In conventional PCDs, the relationships between master-slave pairs are usually recorded in a table which is created prior to runtime. The table usually lists several different scenarios for supporting different bandwidths that correspond to different workloads for a particular master-slave pair.

One problem with conventional PCDs is that the master-slave tables become very complex when the master-slave pairs exist in different switch fabrics relative to one another. Another problem with the tables is that they only may address bandwidth demands based on fixed values which are set when the tables are created. An additional problem occurs when a new master-slave pair is introduced for a PCD. A new master-slave pair may require significant rewriting of the stagnant master-slave tables that are written when a PCD is off-line.

Accordingly, what is needed in the art is a method and system that addresses these problems. Specifically, a method and system is needed in the art for dynamically creating master-slave pairs at runtime for hardware components that may exist within similar switch fabrics and/or across different switch fabrics. Another need exists in the art for a method and system that calculates and adjusts bandwidths for switch fabrics and buses on-the-fly or in real-time without using stagnant tables.

SUMMARY

A method and system for dynamically creating and servicing master-slave pairs within and across switch fabrics of a portable computing device ("PCD") are described. The system and method includes receiving a client request comprising a master-slave pair and conducting a search for a slave corresponding to the master-slave pair. A route for communications within and across switch fabrics may be created that corresponds to the master-slave pair. One or more handles or arrays may be stored in a memory device that correspond to the created route. Next, bandwidth across the route may be set. After the bandwidth across the newly created route is set, the client request originating the master-slave pair may be serviced using the created route. Conducting the search for the slave may include comparing unique identifiers assigned to each slave in a master-slave hierarchy. The search within and across switch fabrics may also include reviewing a fabric route check table for slaves that can be interrogated within a switch fabric.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 9B illustrates an exemplary second software request type;

DETAILED DESCRIPTION

Figure 1:
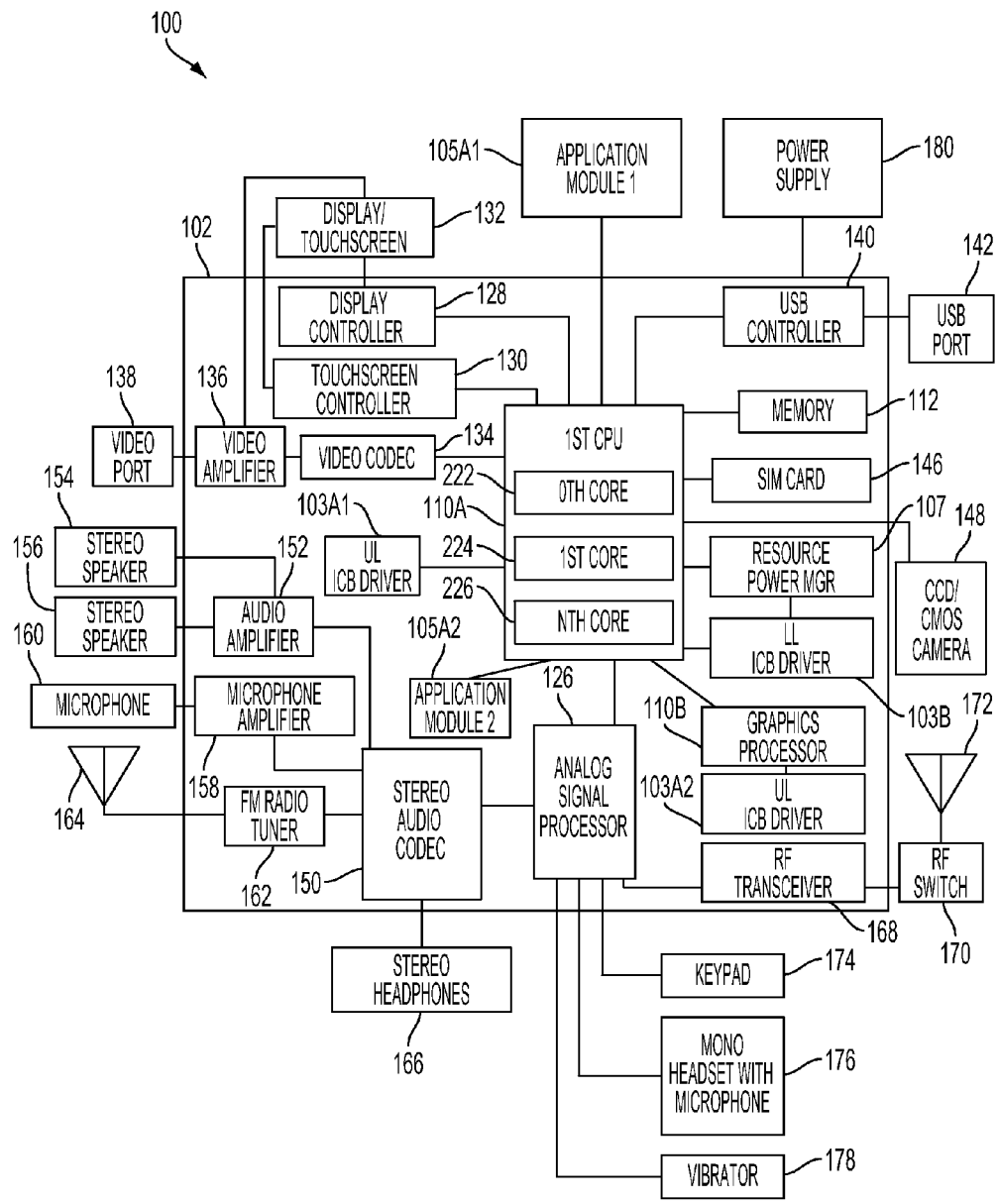
FIG. 1 is a functional block diagram illustrating exemplary elements of a system for dynamically creating and servicing master-slave pairs within and across switch fabrics of a portable computing device ("PCD")

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

FIG. 1: System Elements for Dynamically Creating And Servicing Master-Slave Pairs of a PCD 100

Referring to FIG. 1, this figure is a functional block diagram of an exemplary, non-limiting aspect of a PCD 100 in the form of a wireless telephone for implementing methods and systems for dynamically creating and servicing master-slave pairs within and across switch fabrics. As shown, the PCD 100 includes an on-chip system 102 that has a multi-core, central processing unit ("CPU") 110A, a graphics processor 110B, and an analog signal processor 126. These processors 110A, 110B, 126 may be coupled together.

The CPU 110A may comprise a zeroth core 222, a first core 224, and an Nth core 226 as understood by one of ordinary skill in the art. In an alternate embodiment, instead of using a CPU 110A and a graphics processor 110B, one or more digital signal processors ("DSPs") may also be employed as understood by one of ordinary skill in the art.

The PCD 100 may comprise internal chip bus ("ICB") driver modules 103 that are executed by processors 110. One of ordinary skill in the art will recognize that each ICB driver module 103 may comprise one or more software modules that may be divided into various parts and executed by different processors 110, 126 without departing from this disclosure.

The ICB driver modules 103 may be responsible for the dynamic creation and servicing of master-slave pairs for processing and supporting software requests issued by application program modules 105. There may be two types of ICB driver modules 103: an upper layer ("UL") type 103A; and a lower layer ("LL") type 103B. Generally, the UL ICB driver types 103A will usually be executed by one or more processors 110, 126 that may support the various application modules 105. The LL ICB driver types 103B will usually be executed by one hardware element referred to as the resource power manager 107.

The resource power manager 107 running the LL ICB driver 103B will be generally responsible for applying and setting bandwidth values. These bandwidth values will be applied by the resource power manager 107 to one or more buses and/or switch fabrics described below in connection with FIG. 2. The resource power manager 107 is generally responsible for setting the clock speeds for switch fabrics and buses as well as the clock speeds for the slaves. Slaves are generally hardware components that support requests from master processors 110 running application programs 105.

The ICB drivers 103A, B in combination with the resource power manager 107 allow for the dynamic creation of master-slave pairs at runtime for hardware components that may exist within similar switch fabrics and/or across different switch fabrics. The ICB drivers 103A, B and resource power manager 107 may calculate and adjusts bandwidths for switch fabrics and buses on-the-fly or in real-time.

In a particular aspect, one or more of the method steps described herein may implemented by executable instructions and parameters stored in the memory 112 that include the ICB drivers 103A, B. These instructions that form the ICB drivers 103A, B may be executed by the CPU 110, the analog signal processor 126, and the resource power manager 107. Further, the processors 110A, 126, the memory 112, the instructions stored therein, or a combination thereof may serve as a means for performing one or more of the method steps described herein.

FIG. 1: Other Elements of the PCD 100

As illustrated in FIG. 1, a display controller 128 and a touchscreen controller 130 are coupled to the multicore CPU 110A. A touchscreen display 132 external to the on-chip system 102 is coupled to the display controller 128 and the touchscreen controller 130.

Figure 2:
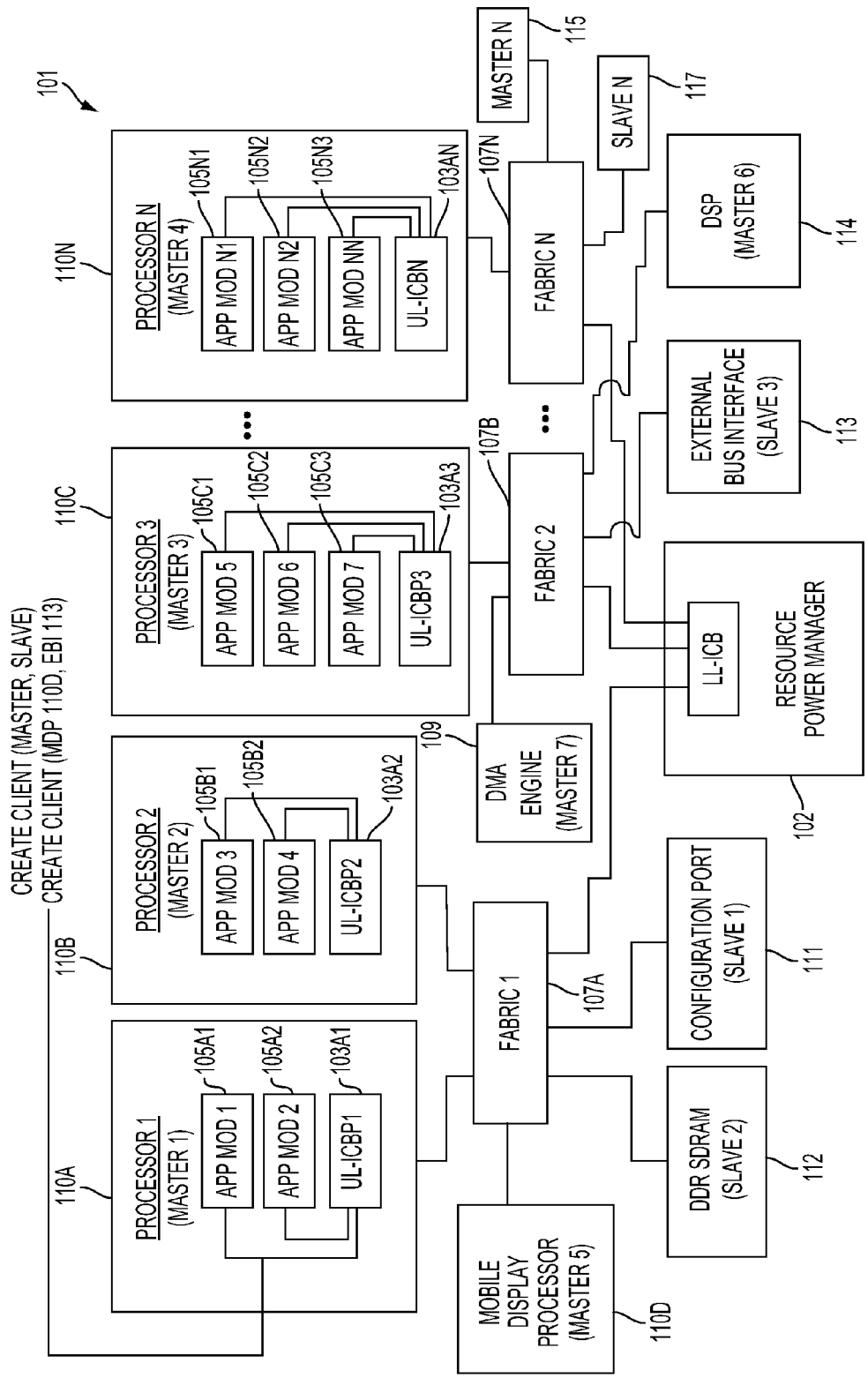
FIG. 2 is a functional block diagram illustrating a system 101 for dynamically creating and servicing master-slave pairs which includes an internal chip bus ("ICB") driver module 103 residing in each processor 110 that helps form several different master-slave pairs within and across switch fabrics of the PCD 100.

FIG. 1 also illustrates a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134 coupled to the multicore central processing unit ("CPU") 110A. A video amplifier 136 is coupled to the video encoder 134 and the touchscreen display 132. A video port 138 is coupled to the video amplifier 136. As depicted in FIG. 2, a universal serial bus ("USB") controller 140 is coupled to the CPU 110A. Also, a USB port 142 is coupled to the USB controller 140. A subscriber identity module (SIM) card 146 may also be coupled to the CPU 110A. Further, as shown in FIG. 1, a digital camera 148 may be coupled to the CPU 110A. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 322.

FIG. 2 is a functional block diagram illustrating a system 101 for dynamically creating and servicing master-slave pairs. The system includes an upper layer ("UL") internal chip bus ("ICB") driver module 103A that usually resides in each processor 110. The ICB driver module 103A may help form several different master-slave pairs within and across switch fabrics of the PCD 100. The system 101 also includes a lower layer ("LL") ICB driver 103B that usually resides within the resource power manager 102.

As noted above, the ICB driver module 103 generally comprises software. However, the driver module 103 may be implemented with hardware and/or a combination of hardware and software. Each UL ICB driver module 103A may be coupled to respective application program modules 105 that are executed by a respective processor 110. For example, the first UL ICB module 103A1 may be coupled to a first application module 105A1 and a second application program module 105A2.

The application program modules 105 may comprise any number of different types of program modules available for PCDs 100. For example, a program module 105 may include, but is not limited to, graphics processing software for supporting entertainment programming like video games, audio files, and videos; business software for supporting business applications like word processing, e-mails, spreadsheets, calendars, and the like. Other program modules 105 include, but are not limited to, navigation programs such as global positioning satellite ("GPS") programs, downloadable customized applications such as for shopping, learning, etc.

In FIG. 2, four central processing units ("CPUs") 110A, 110B, 110C, and 110N are illustrated. Each CPU 110 may be coupled to a respective switch fabric 107. Further details about switch fabrics 107 will be described below in connection with FIG. 3.

The first switch fabric 107A may be coupled to first and second CPUs 110A, 110B, a mobile display processor 110D, a double data rate synchronous dynamic random access memory ("DDR SDRAM") 112, a configuration port 111, and the resource power manager 102. The second switch fabric 107B may be coupled to a third CPU 110C, a dynamic memory allocation/access ("DMA") engine 109, the resource power manager 102, an external bus interface 113, and the digital signal processor 114. The third switch fabric 107N, is coupled to a fourth CPU 110N, a master hardware element 115, and a slave hardware element 117.

The first CPU 110A may be referenced as a first master in a master-slave hierarchy for the system 1010. The second CPU 110B, third CPU 110C, and fourth CPU 110N may be referenced as second, third, and fourth masters respectively. Other masters may include, but are not limited to, the mobile display processor 110D acting as the fifth master, a digital signal processor ("DSP") acting as the sixth master, and a dynamic memory allocation/access ("DMA") engine 109 acting as a seventh master.

Meanwhile, the configuration port 111, the DDR memory 112, and the external bus interface 113, may be referenced as the first, second, and third slaves in the master-slave hierarchy for the system 101. Each of these slaves may service software requests generated by a respective master.

As noted previously, seven masters are illustrated in FIG. 2. One of ordinary skill in the art will appreciate that a fewer number or a greater number of masters may be employed in the system 101 without changing its scope. This also is true for slaves: a fewer number or greater number of slaves may be employed as understood by one of ordinary skill in the art.

The UL ICB drivers 103A residing on the CPUs 110 may review software requests issued by each application program module 105 of a respective master CPU 110. The UL ICB drivers 103A in combination with the LL ICB driver 103B may also adjust settings of the switch fabrics 107 in response to their review of the software requests and their corresponding demands.

In exemplary embodiments of PCD 100, the number of masters in a system 101 will often exceed the number of slaves. For example, a PCD 100 with system 101 may have between about forty to about fifty masters, and between about ten to about fifteen slaves.

According to the exemplary system 101, a UL ICB driver 103 may receive a client request from an application program module 105. For example, the first UL ICB driver 103A1 may receive a create client request from the first application module 105A1. The create client request may include a master-slave pair, such as the mobile display processor ("MDP") 110D (a master) and the external bus interface 113 (a slave).

The MDP 110D (master) resides within the first switch fabric 107A while the external bus interface 113 (slave) resides within the second switch fabric 107B. In the conventional art, a static or stagnant table would need to be created prior to runtime which is prior to the creation of the client request. This static table would list the relationships and routes between the MDP 110D (master) and the external bus interface 113 (slave).

Instead of accessing a static table at this juncture, the system 101 may conduct a search across the switch fabrics 107 to determine one or more communication routes between the MDP 110D (master) and the external bus interface 113 (slave). Once this route between the master and slave is determined, the system 101 may set the bandwidths for the communication routes which may extend within and across different switch fabrics 107. Further details of the method for dynamically creating and servicing master-slave pairs within and across switch fabrics of the PCD 100 will be described below in connection with FIGS. 4-10.

Figure 3:
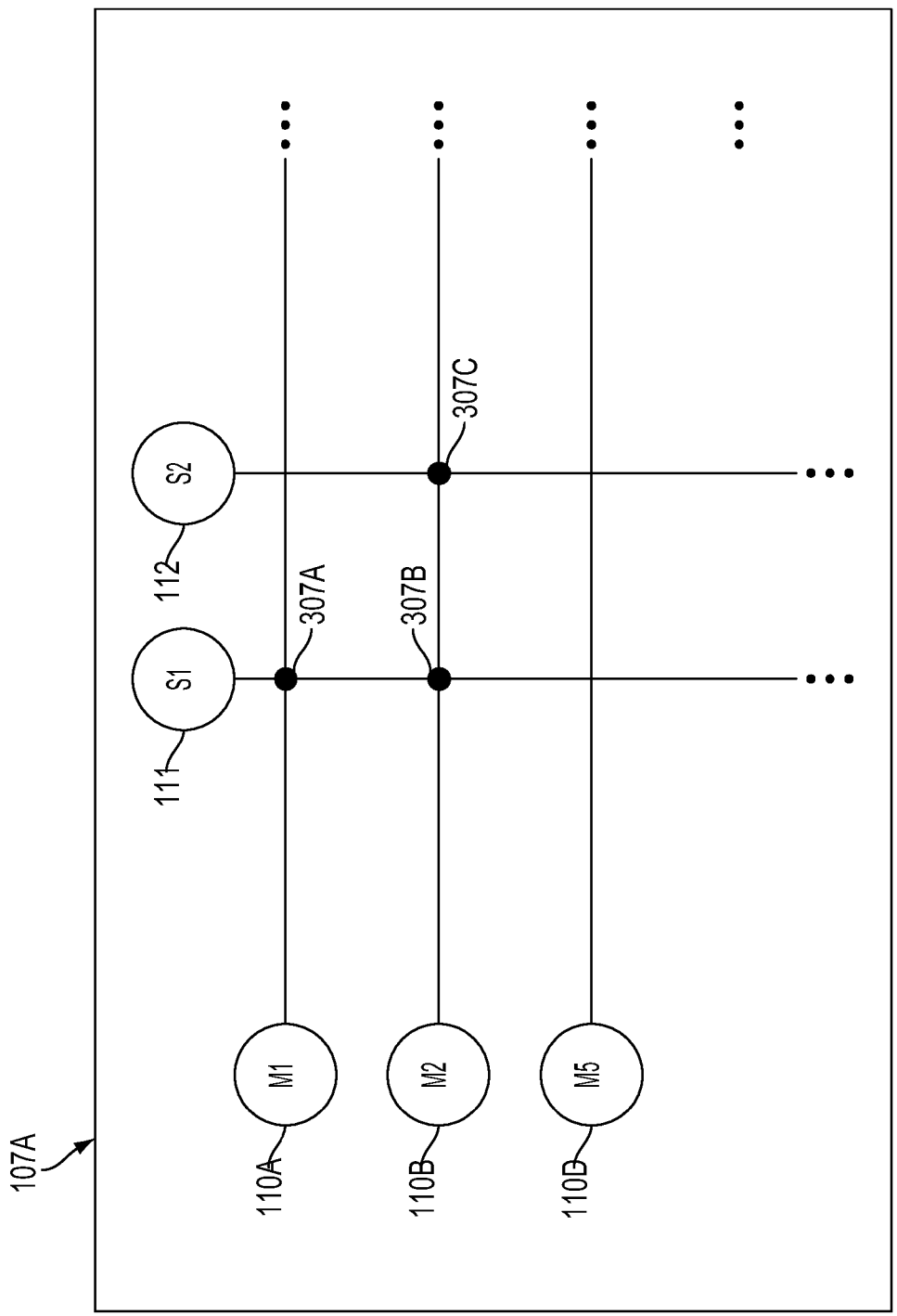
FIG. 3 is a functional block diagram illustrating details of a switch fabric for a bus architecture.

FIG. 3 is a functional block diagram illustrating details of the first switch fabric 107A of FIG. 2. A switch fabric 107A may be generally referred to as a bus architecture as understood by one of ordinary skill in the art. The letter "M" in this diagram represents masters in a master-slave hierarchy for the switch fabric 107A while the letter "S" in this diagram represents slaves.

The first switch fabric 107A comprises a network topology where network nodes (M1, M2, M5, S1, S2) connect with each other via one or more network switches such as by crossbar switches 307. This first switch fabric 107A illustrated in FIG. 3 generally corresponds with the first switch fabric 107A of FIG. 2. Switch fabric 107A may offer better total throughput compared to other bus designs, because traffic is spread across multiple physical links.

In the exemplary embodiment of FIG. 3, the first Master 1 110A may be coupled to the first Slave 1 111 and the second Slave 2 112. Similarly, the second Master 2 110B may be coupled to the first Slave 1 111 and the second Slave 2 112. And so on. An exemplary implementation of a switched fabric 107 as of this writing is PCI Express. As illustrated in FIG. 3, the three masters M1, M2, and M5 of the exemplary first switch fabric 107A may utilize each of the various crossbar switches 307A, 307B, and 307C to connect to a respective slave.

Figure 4:
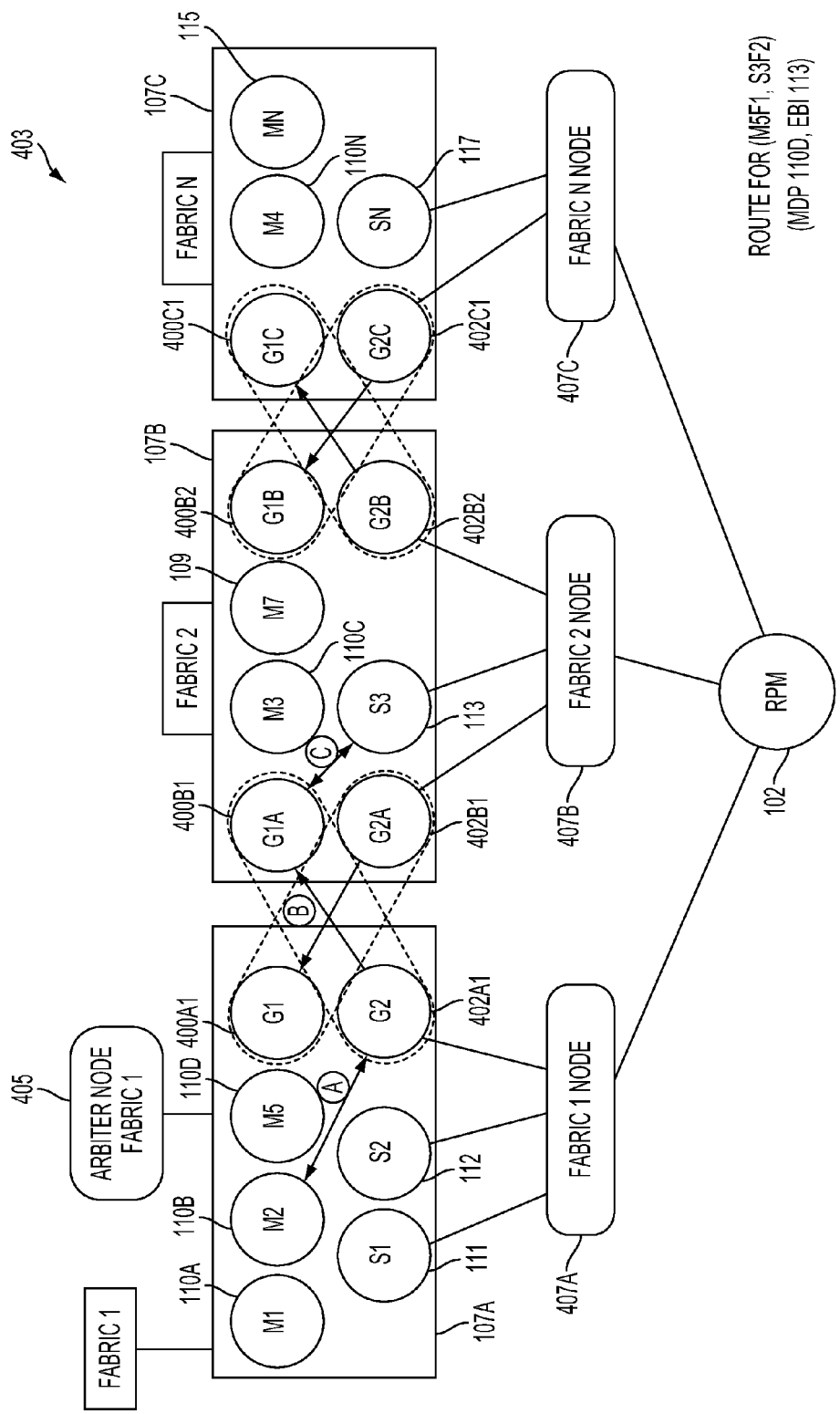
FIG. 4 is a diagram of a node graph for supporting various routes between master-slave pairs located within different switch fabrics.

FIG. 4 is a diagram of a node graph or node architecture 403 for supporting various routes between master-slave pairs located within the three different switch fabrics 107A, 107B, and 107C. The node architecture 403 illustrates how the ICB driver 103 characterizes the relationships between master-slave pairs located within and between different switch fabrics 107.

The node architecture 403 comprises an arbiter node 405 that is coupled to the first switch fabric 107A. An arbiter node 405 may exist for each switch fabric 107. However, FIG. 4 only illustrates a single arbiter node 405 for the first switch fabric 107A. The arbiter node 405 may receive software requests from each of the application modules 105 running on a particular master hardware device.

The first switch fabric comprises three masters: the first master node M1 110A corresponding to the first CPU 110A, the second master node M2 110B corresponding to the second CPU 110B, and the fifth master node M5 110D corresponding to the MDP 110D of FIG. 2.

The first switch fabric 107A has two slaves: a first slave node S1 111 corresponding to the configuration port 111, and a second slave node S2 112 corresponding to the DDR SDRAM 112 of FIG. 2. The first switch fabric 107 may further comprise a first gateway node G1 400A1 and a second gateway node G2 402A1. Each second gateway node G2 402 of a switch fabric 107 is coupled to a first gateway node G1 400 of another switch fabric. Each second gateway node G2 402 originates a communication between two different switch fabrics 107 while each corresponding first gateway node G1 400 receives the communication.

For example, the second gateway node G2 402A1 of the first switch fabric 107A may originate a communication that is sent from the first switch fabric 107A to the first gateway node G1 400B1 of the second switch fabric. Conversely, the second gateway node G2 402B 1 may originate a communication that is sent from the second switch fabric 107B to the first gateway node G1 400A1 of the first switch fabric 107A.

Each second gateway node G2 402 of a particular switch fabric 107 may function as a slave for a master of a particular switch fabric 107 and then function as a master when the second gateway node G2 402 is establishing communications with another gateway node, such as a first gateway node G1 400 on another switch fabric 107. For example, for communications flowing from second master M2 110B to the second gateway node G2 402A1, the second gateway node G2 402A1 functions as a slave relative to the second master M2 110B. However, relative to the first gateway node G1A 400B1 on the second switch fabric 107B, the second master M2 110B functions as a master while the first gateway node G1A 400B1 functions as a slave relative to second gateway node G2 402A1. In other exemplary embodiments, these pairings between first and second gateways G1 400 and G2 402 across different switch fabrics 108 may be represented in software by a single gateway node (not illustrated) that acts as both a slave and a master.

The first and second gateway nodes G1 400 and G2 402 allow communications between different switch fabrics 107. By using the first and second gateway nodes G1 400 and G2 402, a master M of a first fabric 107A may locate a particular slave node S which may reside in a different switch fabric 107 such as the second switch fabric 107B as illustrated in FIG. 4.

For example, suppose a software request originating from the arbiter node 405 for the first fabric 107 requested a master-slave pair comprising the fifth master node M5 110D of the first switch fabric 107A and the third slave node S3 113 of the second switch fabric 107B. The ICB driver 103 would first determine if the requested third slave node S3 113 was part of the first switch fabric 107A. The ICB driver 103 would compare the identifier of the requested third slave S3 113 with the identifiers for the first and second slave nodes S1 and S2 of the first switch fabric 107A.

Once the ICB driver 103 determines that the requested third slave node S3 113 does not exist within the first switch fabric, the ICB driver 103 would then issue a request to the second gateway node G2 402A1 (along line segment A) to conduct a search in the next switch fabric 107B. The second gateway node G2 402A1 would then issue a command or an instruction (along line segment B) to the first gateway 400B 1 to conduct a search of the second switch fabric 107D for the requested third slave node S3 113. The first gateway 400B one of the second switch fabric 107B would then conduct a search for the third slave node as 3113 using the unique identifier for the third slave node as three as the basis of comparison against the slave nodes S as of the second switch fabric 107B.

Once the third slave node S3 113 has been discovered, the first gateway G1 400B1 would issue a command (along line segment C) to establish a communication link between the third slave node S3 113 and the first gateway node G1 400B1 of the first switch fabric 107B. Therefore, the ICB driver 103 would record the route established between the fifth master 110D of the first switch fabric 107A and the requested third slave S3 113 of the second switch fabric 107B.

As illustrated in FIG. 4, the second switch fabric 107B may comprise three master nodes M3 110C, M6 114, and M7 109: a master node M3 110C corresponds to the third processor 110C of FIG. 2; the master node M6 corresponds with the DSP 114 of FIG. 2; and the master node M7 109 corresponds with the DMA engine 109 of FIG. 2. The second switch fabric 107B may further comprise additional gateway nodes G1B 400B2 and G2B 402B2 that couple the second switch fabric 107B to the third switch fabric 107C. Similarly, the third switch fabric 107C may comprise two master nodes M4 110N and Mn 115 and a single slave node SN 117.

The node architecture 403 may further comprise three switch fabric nodes 407A, 407B, and 407C that are coupled to an RPM node 102. The switch fabric nodes 407 may correspond with the switch fabrics 107 of FIG. 2. Similarly, the RPM node 102 may correspond with the resource power manager 102 of FIG. 2.

The RPM node 102 may issue commands to the switch fabric nodes 407 in order to control their respective bandwidth parameters for the nodes within a particular switch fabric 107. As illustrated in FIG. 4, each slave S or second gateway G2 of a switch fabric 107 is coupled to a corresponding fabric node 407.

Figure 5:
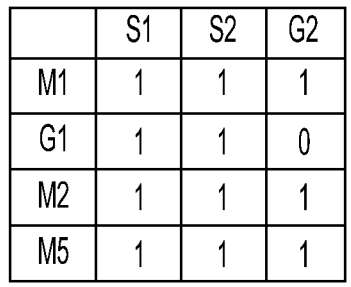
FIG. 5 is a first route check table for master level nodes of the first switch fabric illustrated in FIG. 4.

FIG. 5 is a first route check table 507 for master level nodes of the first switch fabric 107A illustrated in FIG. 4. The first route check table 507 lists the slaves of the first switch fabric 107A that may be checked by a respective master wherein the ICB driver module 103 is forming a master-slave pair on-the-fly or dynamically. This route check table 507 is used by the ICB driver module 103 when it searches within the first switch fabric 107A for a particular slave that was requested in a software request issued by a particular software application module 105. The one (1) values in the table 507 indicate that a respective master may consult with a particular slave to determine if a particular slave matches the slave in the software request. The zero (0) values in the table 507 indicate that a respective master may not consult with a particular slave to determine if a particular slave matches the slave in the software request.

For example, when the first gateway G1 400A1 of FIG. 4 is acting as a master for a communication that originates from the second gateway G2A 402B1 of the second switch fabric 107B, the first gateway G1 400A1 is not permitted to conduct a search for a slave with the second gateway G2 402A1 as reflected by the zero in the fourth row and fourth column of table 507. The blocking of a search for a slave against the second gateway G2 402A1 may prevent an endless programming loop that would occur if such a search or permitted between the first gateway G1 400A1 and the second gateway G2 402A1.

Figure 6:
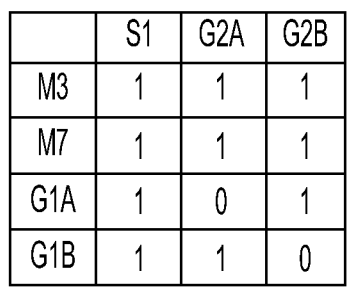
FIG. 6 is a second route check table for master level nodes of the second switch fabric illustrated in FIG. 4.

FIG. 6 is a second route check table 607 for master level nodes of the second switch fabric 107B illustrated in FIG. 4. The second route check table 607 lists the slaves of the second switch fabric 107B that may be checked by a respective master wherein the ICB driver module 103 is forming a master-slave pair on-the-fly or dynamically. This route check table 607 is used by the ICB driver module 103 when it searches within the second switch fabric 107B for a particular slave that was requested in a software request issued by a particular software application module 105. The one (1) values in the table 607 indicate that a respective master may consult with a particular slave to determine if a particular slave matches the slave in the software request. The zero (0) values in the table 607 indicate that a respective master may not consult with a particular slave to determine if a particular slave matches the slave in the software request.

For example, when the first gateway G1B 400B2 is acting as a master for a communication that originates from the second gateway G2 402C 1 of the third switch fabric 107C, the first gateway G1B 400B2 is not permitted to conduct a search for a slave with the second gateway G2B 402B2 as reflected by the zero in the fourth row and fourth column of table 607. The blocking of a search for a slave against the second gateway G2B 402B2 may prevent an endless programming loop that would occur if such a search or permitted between the first gateway G1B 400B2 and the second gateway G2B 402B2. The third switch fabric 107C would also have a route check table. However, such a route table for the third switch fabric 107 was not illustrated and would be easily generated as understood by one of ordinary skill in the art.

Figure 7:
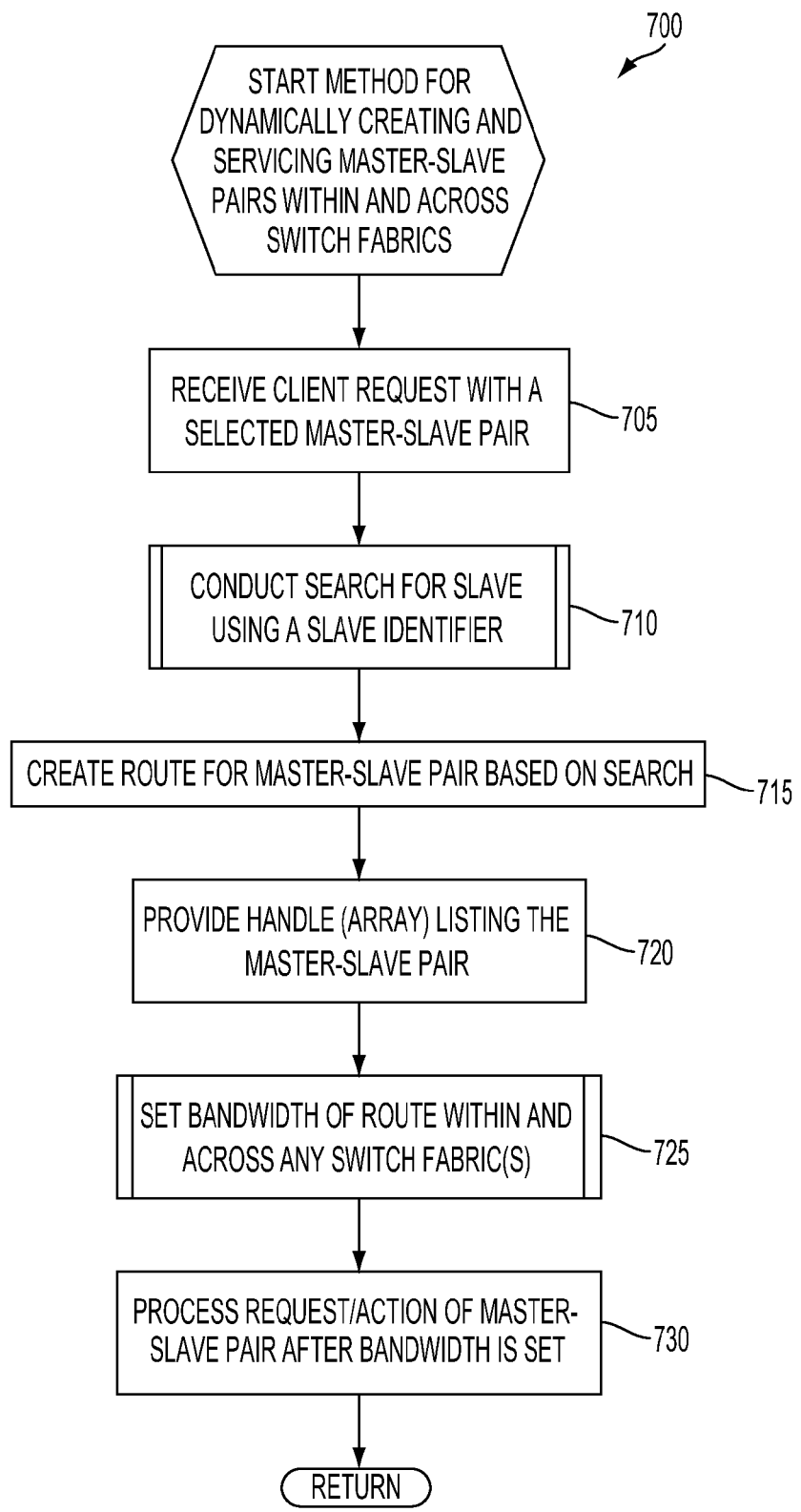
FIG. 7 is a logical flowchart illustrating a method for dynamically creating and servicing master-slave pairs within and across switch fabrics of a portable computing device ("PCD")

FIG. 7 is a logical flowchart illustrating a method 700 for dynamically creating and servicing master-slave pairs within and across switch fabrics 107 of a portable computing device ("PCD"). Block 705 is the first step of method 700. In block 705, the ICB driver module 103 may receive a client request comprising a master-slave pair. The client request may be generated by an application program module 105 running on a processor such as the first CPU 110 as illustrated in FIG. 2.

Next, in routine block 710, the ICB driver 103 may conduct a search for the slave in the master-slave pair that was provided in the client request in block 705. The ICB driver 103 may use a unique identifier corresponding to the requested slave in order to perform the search. In this routine block 710, the ICB driver module 103 would utilize the node architecture 403 illustrated in FIG. 4 in order to conduct the search for the requested slave. Further details of this routine block 710 will be described below in connection with FIG. 8. Usually, the upper layer ICB ("UL ICB") driver 103A which may reside on a corresponding CPU 110 as illustrated in FIG. 2 may perform the steps of this routine block 710.

After routine block 710, in block 715, the ICB driver module 103 would create a route within and across switch fabrics 107 for the master-slave pair based on the search which was conducted in routine block 710. This route would list the starting point usually comprising a master such as the fifth master M5 110D as illustrated in FIG. 4. The route would also include the three segments A, B, and C as illustrated in FIG. 4 that would be traversed to establish communications between the selected master-slave pair.

Next, in block 720, the handle or array listing the specific nodes that form the master-slave pair which may exist within and/or across different switch fabrics 107 would be provided back to the application program module 105 that originated the client request. Subsequently, in routine block 725, the ICB driver module 103 may set the bandwidth of the established route within and across any switch fabrics 107. According to this routine block 725, the lower layer ICB ("LL ICB") driver module 103B would execute the steps of this routine. The LL ICB driver module 103B residing on the RPM 102 would set bandwidths across the established route by issuing commands from the RPM node 102 to the fabric nodes 407 as well as the nodes of a particular fabric 107 as illustrated in FIG. 4. Further details about routine block 725 will be described in further detail in connection with FIG. 9.

Next in block 730, the requested action within the client request would then be performed by the master-slave pair that may exist within and across different switch fabrics 107. The method 700 within returned back to block 705 or it may end.

Figure 8:
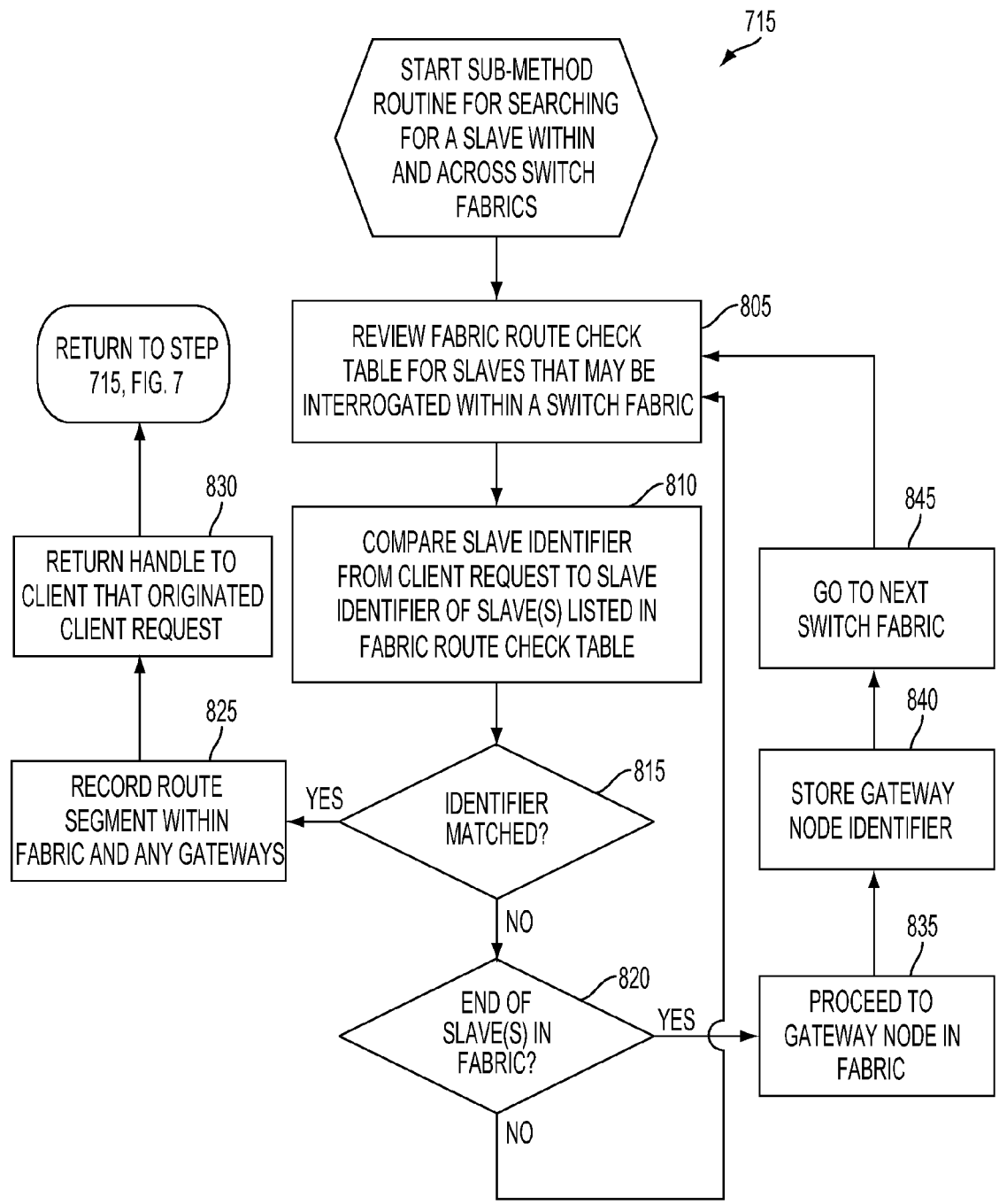
FIG. 8 is a logical flowchart illustrating a submethod or routine for searching for a slave using a slave identifier.

FIG. 8 is a logical flowchart illustrating a submethod or routine 715 for searching for a slave of a master-slave pair using a slave identifier. Block 805 is the first step of the submethod or routine 715. In block 805, the ICB driver module 103A reviews the fabric route check table, such as table 500 and table 600 illustrated in FIG. 5 and FIG. 6 respectively, in order to determine which slaves may be interrogated within a particular fabric 107 for identifying the requested slave of a master-slave pair from a client request.

Next, in block 810, the ICB driver module 103A may compare the slave identifier of the requested slave to the slave identifier listed in the route check table. Next, in decision block 815, the ICB driver module 103A determines if there is a match between the current slave identifiers. If the inquiry to decision block 815 is positive, then the "YES" branch is followed to block 825. If the inquiry to decision block 815 is negative, then the "NO" branch is followed to decision block 820.

In block 825, the ICB driver 103A records the route that has been traversed to reach the matched slave. This route may include communication segments occurring only within a single switch fabric 107 or communication segments that traverse one or more different switch fabrics 107. Next, in block 830, the ICB driver module 103A may return a handle or an array listing all of the nodes traversed to establish the master-slave pair that was included in the client request issued by an application program module 105. The submethod or routine 715 then returns to step 715 of FIG. 7.

Referring back to decision block 820 that occurs when the negative condition of decision block 815 is reached, the ICB driver module 103A determines if all of the slaves of a particular switch fabric have been interrogated for the requested slave. If the inquiry to decision block 820 is negative, then the "NO" branch is followed back to block 805. If the inquiry to decision block 820 is positive, then the "YES" branch is followed to block 835 in which the ICB driver module 103A proceeds to a gateway node, such as gateway node G2 402A1 as illustrated in FIG. 4.

Next, in block 840, the gateway identifier is stored by the ICB driver module 103A. The ICB driver module 103A in block 845 then enters into the next which fabric 107, such as the second switch fabric 107B, and starts a new search by returning to block 805. Block 845 may generally correspond to the ICB driver module 103A utilizing the first gateway node G1A 400B1 as a master. In block 805, assuming that the first gateway G1A 400B1 is the current master being utilized for a search, the ICB driver module 103A would look at the third row of the fabric route check table 600 as illustrated in FIG. 6.

Figure 9A:
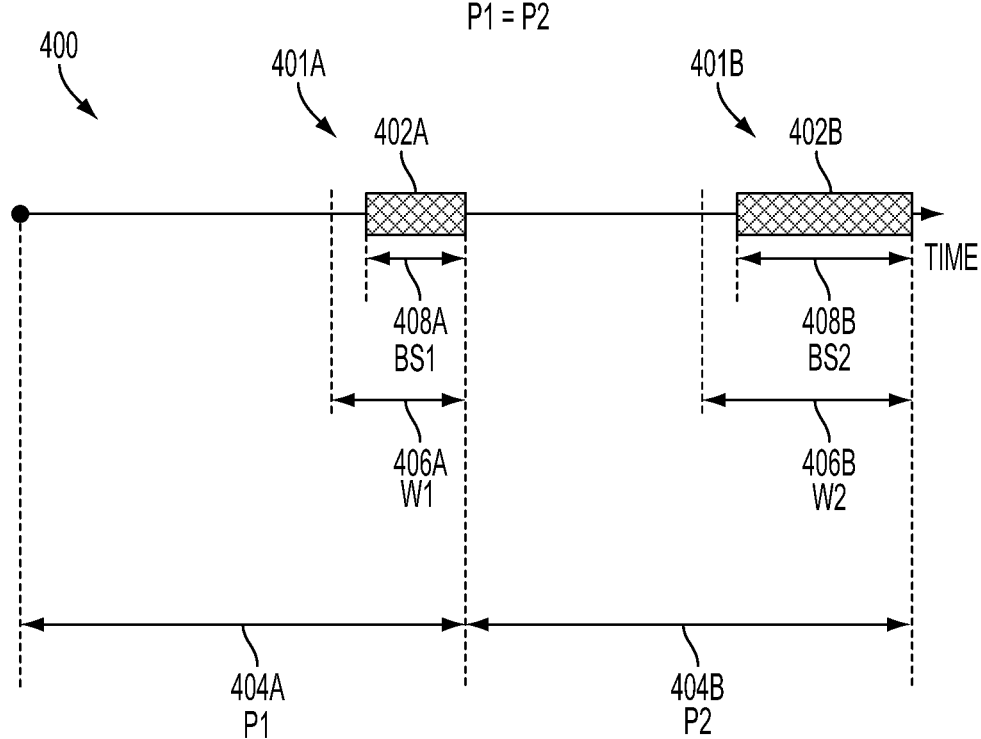
FIG. 9A illustrates an exemplary first software request type.

As will be described in further detail below, the method 700 and system 101 utilize certain metrics to manage bandwidth within and across switch fabrics 107. FIGS. 9A-9B illustrate the metrics used by the method 700 and system 101 to manage the bandwidth requirements that are usually part of any software request issued by an application program module 105 that is running on a particular processor 110.

Specifically, FIG. 9A illustrates an exemplary first software request type 401. This first software request type 401 may originate from characterized as "bursty." Each software request, such as the first "bursty" software request type 401, may be measured with two different metrics: instantaneous bandwidth (Ib) and average bandwidth (Ab).

The instantaneous bandwidth (Ib) may represent a worst case need/scenario for a switch fabric 107 across all masters in the master-slave hierarchy for the switch fabric 107. Ib may be generally characterized as the "speed limit" of a bus or switch fabric since this parameter may be used by the ICB driver module 103 to set the frequency of the switch fabrics 107. The calculation and/or corresponding equation to determine Ib may be unique for each type of software request originating from a particular application program module 105.

The average bandwidth (Ab) may represent an actual data size that is propagated over one or more switch fabrics 107. Ab may be used by the ICB driver module 103 to set arbitration rules among masters and slaves for one or more switch fabrics 107.

The first software request type 401 was characterized as "bursty" to address software requests that provide for discontinuous use of one or more switch fabrics 107. These software request types may transmit large blocks of data over switch fabrics 107 within very short time intervals and then remain dormant for some period of time. The dormant stage may usually last longer than the active time used to transmit the large blocks of data.

For the first "bursty" software request type 401, the Ib value may be determined by the following equation:

$$Ib = BS/W \qquad \text{EQN:1}$$

where "Ib" is instantaneous bandwidth; "BS" is block size expressed in number of bytes, and "W" is window size expressed in units of time, such as milliseconds.

The Ab value for the first "bursty" software request type may be determined by the following equation:

$$Ab = BS/P \qquad \text{EQN:2}$$

where "Ab" is average bandwidth; "BS" is block size expressed in number of bytes, and "P" is period expressed in units of time, such as milliseconds.

FIG. 9A illustrates two different "bursty" software requests 401A, 401B. The first software request 401A has a first data block 402A while the second software request 401B has a second data block 402B.

In this exemplary embodiment, the magnitude of the first and second periods P1 404A, P2 404A are equal, while the first and second windows W1 406A, W2 406B (which are time frames within the periods P1 and P2) have different magnitudes relative to each other. The first and second block sizes BS1 408A, BS2 408B also have different magnitudes relative to each other.

Since the magnitude of the first block size BS1 402A is relatively small relative to the first period P1 404A, then the average bandwidth Ab value for the first bursty software request 401A will not be that significant in view of Equation (2) for this software request type. Meanwhile, since the magnitude of the second block size BS2 402B is relatively larger relative to the second period P1 404B, then the average bandwidth Ab value for the second bursty software request 401B will be a little greater than the first software request 401A.

Because the block sizes BS for each software request 401A, 401B have magnitudes which are close to their window sizes W1 406A, W2 406B, the instantaneous bandwidth values Ib for these two requests 401 may be significant in view of Equation (1) for this software request type. Both Ib values for these requests 401A, 401B may also be very close in magnitude relative to one another.

FIG. 9B illustrates an exemplary second software request type 501 that may be characterized as a "CPU" type 501. CPU software request types 501 usually originate from central processing units (CPUs) 110. The instantaneous bandwidth Ib value may be determined as follows:

$$Ib = \text{Throughput Bandwidth} \quad \text{EQN:3}$$

where "Ib" is the instantaneous bandwidth; and Throughput Bandwidth is the desired clock speed of the CPU 110.

The average bandwidth Ab value for CPU software request types 501 may be determined as follows:

$$Ab = T \times Z\% \text{ (percentage)} \quad \text{EQN:4}$$

where "Ab" is average bandwidth; where "T" is Throughput Bandwidth described above; and "Z%" is a percentage of use, or a percentage of cache misses, as illustrated in FIG. 9B.

For example, for a DMA engine 109 that moves data at 100 Mb per second with a usage rate of 50%, the average bandwidth Ab value would be equal to 100×0.50 which is fifty Mb per second. The instantaneous bandwidth Ib for this DMA engine 109 would be equal to 100 Mb per second.

Meanwhile, a CPU 110 running at 1 GHz translates into a throughput of 800 Mb per second. This throughput value would be equal to the instantaneous bandwidth Ib. If the CPU 110 utilizes a cache with a cache miss rate of 10%, then the average bandwidth Ab value would be equal to (800×0.10) which is 80 Mb per second.

One of ordinary skill in the art will recognize that other software request types may be defined differently in terms of instantaneous bandwidth Ib and the average bandwidth Ab values. These yet to be determined software request types may comprise different equations for arriving at the Ib and Ab values. But because the software request types will be expressed in terms of Ib and Ab values, then the different software request types may be aggregated together to provide the ICB driver module 103 with a good estimate of a current demand for a bus 107.

Figure 9C:
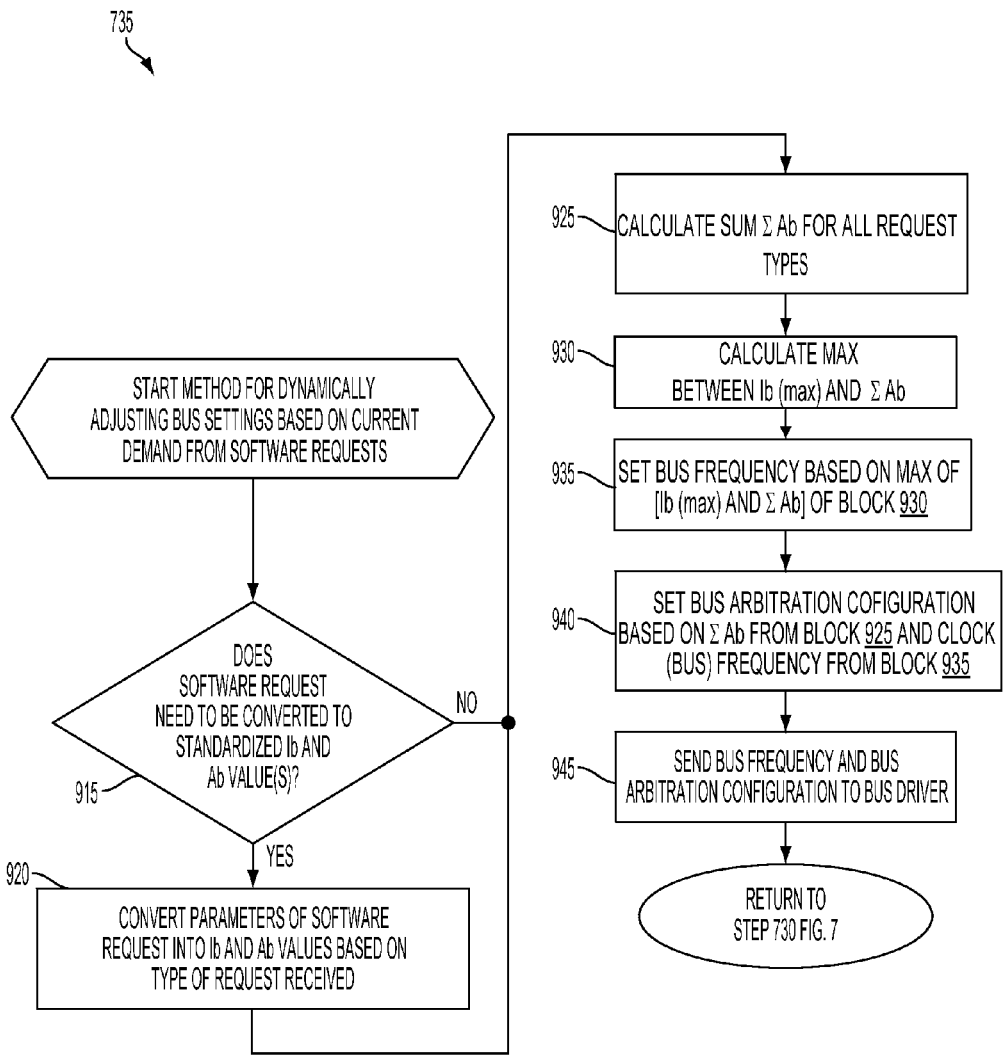
FIG. 9C is a logical flowchart illustrating submethod or routine, corresponding to FIG. 7, for dynamically adjusting bus or switch fabric settings based on current demand from software requests of a PCD utilizing Ib and Ab values derived from software request types illustrated in FIGS. 9A-9B.

FIG. 9C is a logical flowchart illustrating submethod or routine 725 (corresponding to FIG. 7) for dynamically adjusting bus or switch fabric settings based on current demand from software requests of a PCD 100. For this submethod 725, usually the LL ICB driver module 103B residing on the RPM 102 as illustrated in FIG. 2 will perform these steps. However, one of ordinary skill the art recognizes that the UL ICB drivers 103A residing on CPUs 110 may also be used without departing from the scope of this disclosure.

Decision block 915 is the first step of submethod 725. In block 915, the ICB driver module 103B determines if the software request needs to be converted to standardized instantaneous bandwidth (Ib) and average bandwidth (Ab) values. If the inquiry to decision block 915 is negative, then the "NO" branch is followed to block 925. If the inquiry to decision block 915 is positive, then the "YES" branch is followed to block 920.

In block 920, the ICB driver module 103B converts bandwidth parameters of the software request into instantaneous bandwidth (Ib) and average bandwidth (Ab) values based on the software request type and the corresponding equations, such as Equations (1)-(4) described above in connection with FIG. 9A and FIG. 9B.

In block 925, the ICB driver module 103B calculates a sum of all average bandwidth (Ab) values for all software requests that have been issued by respective masters 110 of a PCD 100. Next, in block 930 the ICB driver module 103B determines the maximum between two values: the maximum instantaneous bandwidth (Ib) value compared against the sum of all average bandwidth (Ab) values for all software requests (this is the value calculated in block 925).

Next, in block 935, the ICB driver module 103B sets the bus frequency based on the maximum value which was calculated in block 930 (max value between: single max Ib value and sum of all Ab values). In block 940, the ICB driver module 103B sets the bus arbitration configuration for the bus 107 based on the summed average bandwidth (Ab) across all software requests and the clock frequency value established in block 935.

In block 945, the ICB driver module 103B transmits the bus frequency and bus arbitration configuration to the each switch fabric 107. Then, the submethod 725 returns to block 730.

Figure 9D:
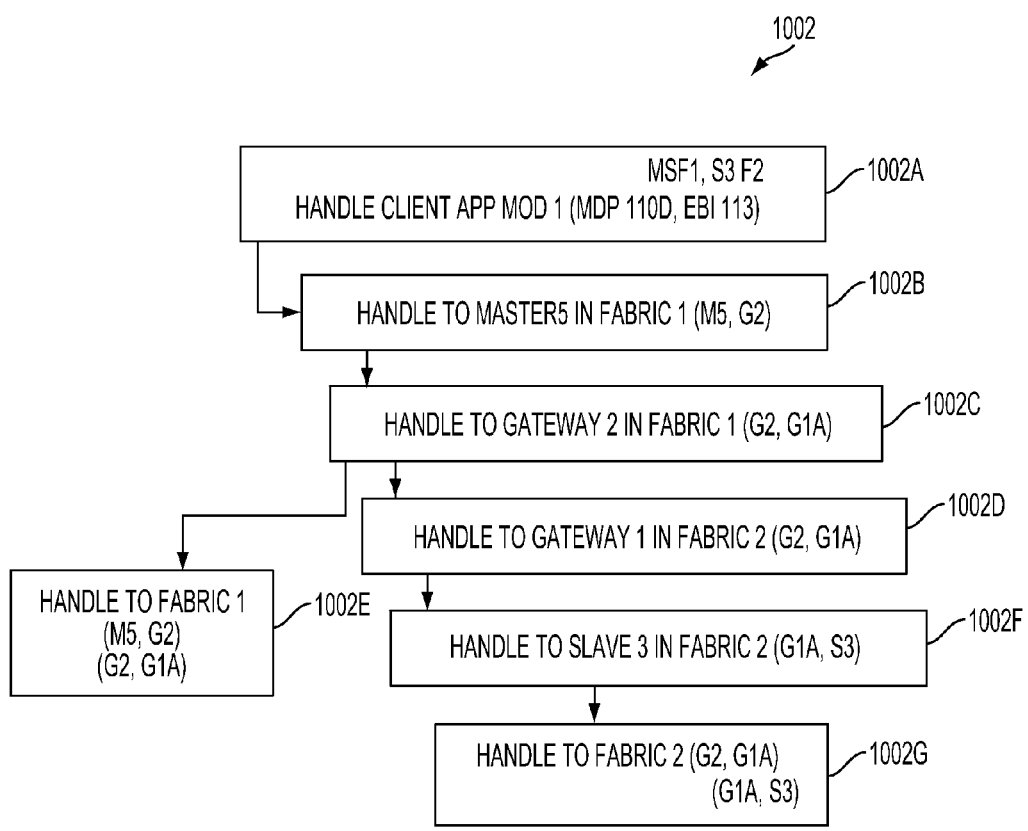
FIG. 9D is a diagram illustrating handles that are created when a master-slave pair is created by the system and method.

FIG. 9D is a diagram illustrating handles or array data structures 1002 formed when a master-slave pair is created by the system 101 and method 700. The handles 1002 are used by the ICB driver module 103B in connection with the nodes illustrated in FIG. 4. Each node illustrated in FIG. 4 is provided with a handle 1002 relative to a master-slave pair that is formed. The particular set of handles 1002 illustrated in FIG. 9D correspond to the master-slave pair form between the fifth master M5 110D of the first switch fabric 107A and the third slave S3 113 of the second switch fabric 107D as illustrated in FIG. 4.

The first handle 1002A for the master-slave pair M5/S3 of FIG. 4 is assigned to the arbiter node 405 of the first switch fabric 107A, as illustrated in FIG. 9D. The second handle 1002B would be assigned to the fifth master M5 110D of the first switch fabric 107 illustrated in FIG. 4. Similarly, the third handle 1002C would be assigned to the second gateway G2 402A1 of the first switch fabric 107A in FIG. 4. The fourth handle 1002D would be assigned to the first gateway G1A 400B1 of the second switch fabric 107A in FIG. 4. And so on.

Each handle 1002 may comprise the current node assigned to the handle 1002 and the other node which is to receive information from the current node or to transmit information to the current node. For example, the second handle 1002B may comprise the assigned node M5 corresponding to the fifth master 110D of the first switch fabric 107A and the second gateway node G2 402A1 of the first switch fabric 107A.

Similarly, the fourth handle 1002D may comprise the current node which is the first gateway G1A 400B1 of the second switch fabric 107B To which the fourth handle 1002D is assigned. The fourth handle 1002D may further comprise the second gateway G2 402A1 of the first switch fabric 107A. The fourth handle 1002D corresponds to the communications segment "B" of FIG. 4 that exist between the second gateway node G2 402A1 of the first switch fabric 107A and the first gateway node G1A 400B1 of the second switch fabric 107B. Each of these handles 1002 may be stored in memory by the ICB driver module 103.

Figure 10A:
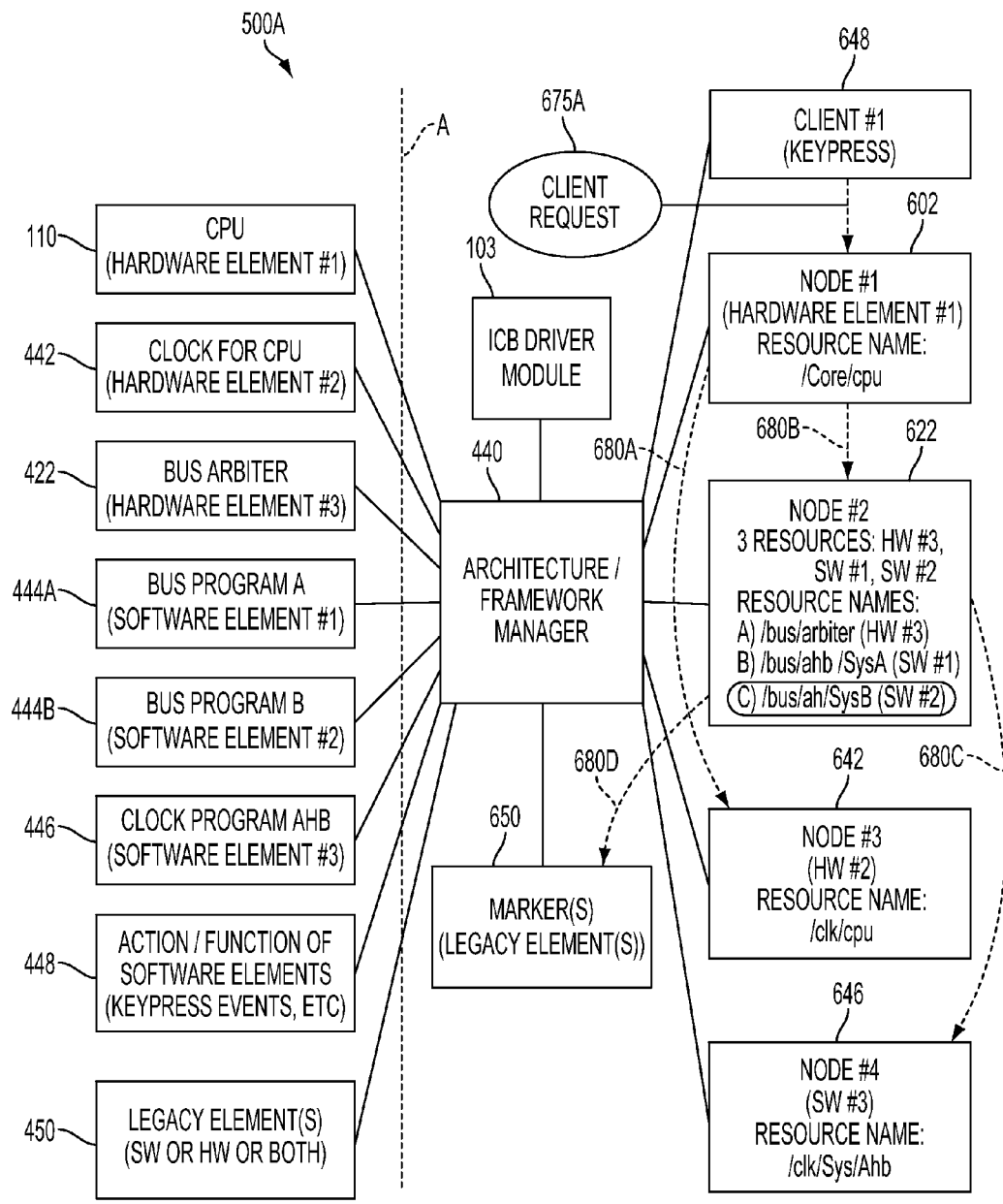
FIG. 10A is a diagram of a first aspect of a node architecture that manages resources of a portable computing device of FIG. 1.

FIGS. 10A-13 as described below are provided to describe how the node architecture of FIG. 4 is established and maintained. FIG. 10A is a diagram of a first aspect of a software architecture 500A for establishing and maintaining the node architecture that is illustrated in FIG. 4.

FIG. 10A is a diagram comprising functional blocks which represent software or hardware (or both). FIG. 10A illustrates an architecture or framework manager 440 that is coupled to a plurality of hardware and software elements, such as, but not limited to: the ICB driver module 103; the central processing unit 110, also referred to generally as the first hardware element (hardware element #1); a clock 442 for the CPU 110, also referred to generally as the second hardware element (hardware element #2); a bus arbiter or scheduler 422, also referred to generally as the third hardware element (hardware element #3); a bus program A-444A, also referred to generally as the first software element (software element #1); a bus program B-444B, also referred to generally as the second software element (software element #2); a clock program AHB, referred to generally as the third software element (software element #3); an action or function monitored by a software element generally indicated as a keypress 448; and a legacy element 450 comprising a software element or a hardware element or both.

An example of a legacy software element may include, but is not limited to, a Dynamic Environment Manager (DEM). This is a software module that handles interprocessor notification of processor sleep events. For example, a first processor A uses the DEM to receive a notification that a second processor B has gone idle/come back from idle. On newer hardware, this software functionality has been subsumed into the route processor module (RPM) subsystem/communication protocol. Other legacy software elements exist and are included within the scope of the invention.

An example of a legacy hardware element may include, but is not limited to, an AMBA (Advanced Microcontroller Bus Architecture) High-performance Bus (AHB). On older PCDs 100. The AHB may comprise the primary system bus, whereas on newer PCDs 100, the system bus fabric 107 is completely different and the AHB bus is only used for special applications to communicate with modules that have not yet been updated to communicate via the new system bus fabric. Other legacy hardware elements exist and are included within the scope of the invention.

The framework manager 440 may comprise a library of computer instructions that manages data structures, such as nodes which communicate with each of the aforementioned hardware and software elements. The framework manager 440 may be responsible for creating one or more resources that may form nodes 602, 622, 642, and 646 as illustrated on the right side of the dashed line A of FIG. 10A.

Figure 10B:
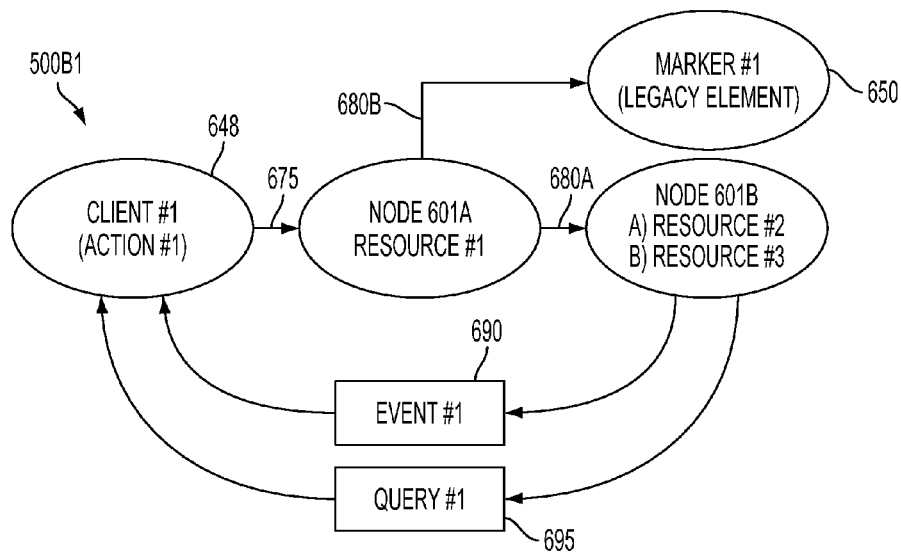
FIG. 10B is a general diagram of a second aspect of the node architecture that manages resources of a PCD of FIG. 1.

The framework manager 440 may communicate directly with each ICB driver module 103 residing on a CPU 110. Each node 602, 622, 642, and 646 on the right side of FIG. 10A is a representation or model of each software or hardware element on the left hand side of the dashed line A of FIG. 10A. The right side of FIG. 10A corresponds generally to the node architecture reflected in FIG. 4 described above. For the remainder of this disclosure, a general or non-specific node will be designated with reference numeral 601 as illustrated in FIG. 10B.

As noted previously, each exemplary node 602, 622, 642, and 646 of FIG. 10A may comprise one or more resources. A resource may comprise a software element or hardware element or both. For example, a first node 602 comprises a single resource that generally corresponds with the first hardware element or central processing unit 110. With the software architecture described in this disclosure, each resource of a node 601 may be provided with a unique name comprising one or more alphanumeric characters. In the exemplary embodiment illustrated in FIG. 10A, the resource of the first node 602 has been assigned the resource name of "core/cpu." This exemplary resource name generally corresponds to conventional file naming structures known to one of ordinary skill in the art. However, as recognized by one of ordinary skill the art, other types of resource names containing any other combination of alpha-numeric characters and/or symbols are well within the scope of the invention.

In the exemplary embodiment of FIG. 10A, the second node 622 comprises a plurality of resources. Specifically, in this particular exemplary embodiment, the second node 622 has a first resource comprising a single hardware element corresponding to the bus arbiter or scheduler 422. The second resource of the second node 622 comprises a software element generally corresponding to the first software element of the bus program A 444A. The third resource of the second node 622 comprises another software element generally corresponding to the second software element of the bus program B 444B. One of ordinary skill the art recognizes that any combination and any number of resources and resource types for a given node 601 are well within the scope of the invention.

In addition to creating nodes 601, the framework manager 440 may also create or instantiate markers 650. A marker may comprise one or more legacy elements, such as a hardware element or software element (or both as well as a plurality of these elements), that do not easily map themselves or are not readily compatible with the software architecture managed by the framework manager 440. A marker 650 can support a resource of a node 601 meaning that a resource of a node 601 may be dependent on a marker 650. One example of a marker 650 may include a string driver. A string driver may not easily fit within the architecture described in connection with FIG. 10A. A marker 650 may be referenced by a node 601 and its dependency array data collected in block 1125 of FIG. 11.

FIG. 10A also illustrates a first client 648 that generally corresponds to an action or function of the two software elements 448, 450. In the exemplary embodiment illustrated in FIG. 10A, the first client 648 generally corresponds to a keypress action that may occur within a particular application program module 105 supported by the portable computing device 100. However, one of ordinary skill in the art recognizes that other actions and/or functions of software elements besides keypresses are well within the scope of the invention. Further details about client requests 648 and their respective creation will be described below in connection with FIG. 13.

FIG. 10A also illustrates relationships between particular architectural elements. For example, FIG. 10A illustrates a relationship between the client 648 and the first node 602. Specifically, the first client 648 may generate a client request 675A, illustrated with dashed lines, that is managed or handled by the first node 602 that comprises the resource "/core/cpu." Typically, there are a predetermined or set number of types of client requests 675. Client requests 675 will be described in further detail below in connection with FIG. 13.

Other relationships displayed in FIG. 10A include dependencies illustrated with dashed lines 680. Dependencies are relationships between respective resources of another node 601. A dependency relationship usually indicates that a first resource (A) is reliant upon a second resource (B) that may provide the first resource (A) with information. This information may be a result of an operation performed by a second resource (B) or it may simply comprise status information that is needed by the first resource (A) or any combination thereof. The first resource (A) and second resource (B) may be part of the same node 601 or they may be part of different nodes 601.

In FIG. 10A, the first node 602 is dependent upon the second node 622 as indicated by the dependency arrow 680B which originates with the first node 602 and extends to the second at 622. FIG. 10A also illustrates that the first node 602 is also dependent upon the third node 642 as illustrated by the dependency arrow 680A. FIG. 10A also illustrates that the second node 622 is dependent upon the fourth node 646 as illustrated by the dependency arrow 680C. One of ordinary skill in the art recognizes that the dependencies 680 illustrated with the dashed arrows of FIG. 10A are only exemplary in nature and that other combinations of dependencies between respective nodes 601 are within the scope of the invention.

The architecture or framework manager 440 is responsible for maintaining the relationships described above, that include, but are not limited to the client requests 675 and the dependencies 680 illustrated in FIG. 10A. The framework manager 440 will try to instantiate or create as many nodes 601 as it can as long as the dependencies 680 for any given node 601 are complete. A dependency 680 is complete when a resource which supports a dependency is in existence or is in a ready state for handling information that relates to the dependency 680.

For example, the first node 602 comprising the single resource "/core/cpu" may not be created or established by the framework manager 440 if the third node 642 comprising the single resource "/clk/cpu" has not been created because of the dependency relationship 680A that exist between the first node 602 in the third node 642. Once the third node 642 has been created by the framework manager 440, then the framework manager 440 may create the second node 602 because of the dependency relationship 680A.

If the framework manager 440 is unable to create or instantiate a particular node 601 because one or more of its dependencies 680 are incomplete, the framework manager 440 will continue running or executing steps corresponding to those nodes 601 that were created successfully by the framework manager 440. The framework manger 440 will usually skip over a call for a particular node 601 which may not exist due to incomplete dependencies in which dependent resources have not been created and return messages to that call which reflect that incomplete status.

In a multicore environment, such as illustrated in FIG. 1, the framework manager 440 may create or instantiate nodes 601 on separate cores, like the first, second and Nth cores 222, 224, and 226 of FIG. 1. Nodes 601 may generally be created in a multicore environment on separate cores and in parallel as long as the nodes 601 are not dependent on one another and if all of a particular node's corresponding dependencies, as described below, are complete.

FIG. 10B is a general diagram of a second aspect of the software architecture 500B1 for a system that manages resources of a PCD 100 of FIG. 1. In this general diagram, the one or more resources of each node 601 have not been provided with unique names. The node or resource graph 500B1 of FIG. 10B comprises only the nodes 601, markers 650, clients 648, events 690, and query functions 695 supported by the architecture or framework manager 440. Each node 601 has been illustrated with an oval shape and arrows 680 with specific directions which represent respective dependencies between resources within a node 601.

Calls within the node architecture illustrated in FIGS. 10A-B may be made to a alias, or an actual resource name of a resource within a node 601. According to one exemplary embodiment, there is not a way to make a client request 675 against a marker 650 since there is no interface between clients 648 and markers 650 so this generally means information exchanged with markers 650 usually originates from a node 601 or resource and not a client 648.

For example, the first node 601A of FIG. 10B has a dependency arrow 680A to indicate that the first node 601A is dependent upon the two resources (resources #2 and #3) of the second node 601B. Similarly, the first node 601A has a dependency arrow 680B to indicate that the first node 601A is also dependent upon the first marker 650 which typically comprises a legacy element of hardware or software or a combination thereof.

FIG. 10B also illustrates how a client 648 of the first node 601A may issue a client request 675 to the first node 601A. After these client requests 675 are issued, the second node 601B may trigger an event 690 or provide a response to a query 695, in which messages corresponding to the event 690 and the query 695 flow back to the client 648.

Figure 10C:
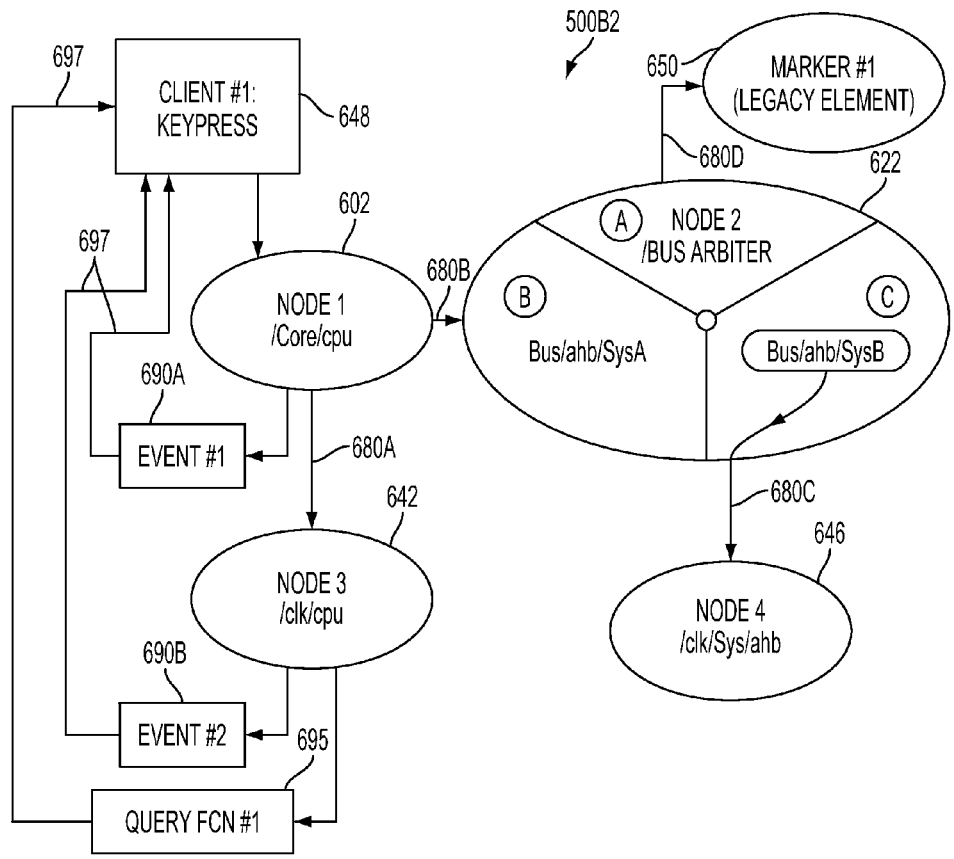
FIG. 10C is specific diagram of a second aspect of the node architecture that manages resources of a PCD of FIG. 1.

FIG. 10C is a specific diagram of a second aspect of the software architecture 500B2 for a system that manages resources of a PCD 100 of FIG. 1. FIG. 10C illustrates a node or resource graph 500B2 that comprises only the nodes 601 with specific, yet exemplary resource names, as well as clients 648, events 690, and query functions 695 corresponding to those of FIG. 10A. Each node 601 has been illustrated with an oval shape and arrows 680 with specific directions which represent respective dependencies between resources within a node 601.

For example, the first node 602 has a dependency arrow 680B to indicate that the first node 602 is dependent upon the three resources of the second node 622. Similarly, the third resource "/bus/ahb/sysB/" comprising the second software element 444B and generally designated with the reference letter "C" in FIG. 10C has a dependency arrow 680C that indicates this third resource (C) is dependent upon the single "/clk/sys/ahb" resource of the fourth node 646.

FIG. 10C also illustrates the output data from nodes 601 which may comprise one or more events 690 or query functions 695. A query function 695 is similar to an event 690. The query function 695 may have a query handle that may or may not be unique. The query function is generally not externally identified and generally it does not have a state. The query function 695 may be used to determine the state of a particular resource of a node 601. The query function 695 and the events 690 may have relationships with an established client 648 and these relationships are represented by directional arrows 697 to indicate that information from respective event 690 and query function 695 are passed to a particular client 648. FIG. 10C also illustrates how the second node 622 of FIG. 10C is dependent upon the first marker 650 via dependency arrow 680D.

The node or resource graphs 500B of FIGS. 10B-10C represent relationships that exist in memory and which are managed by the framework manager 440 and related data structures that may comprise the nodes 601. The node or resource graph 500B can be automatically generated by the framework manager 440 as a useful tool for identifying relationships between respective elements managed by the framework manager 440 and for troubleshooting by a software team.

Figure 10D:
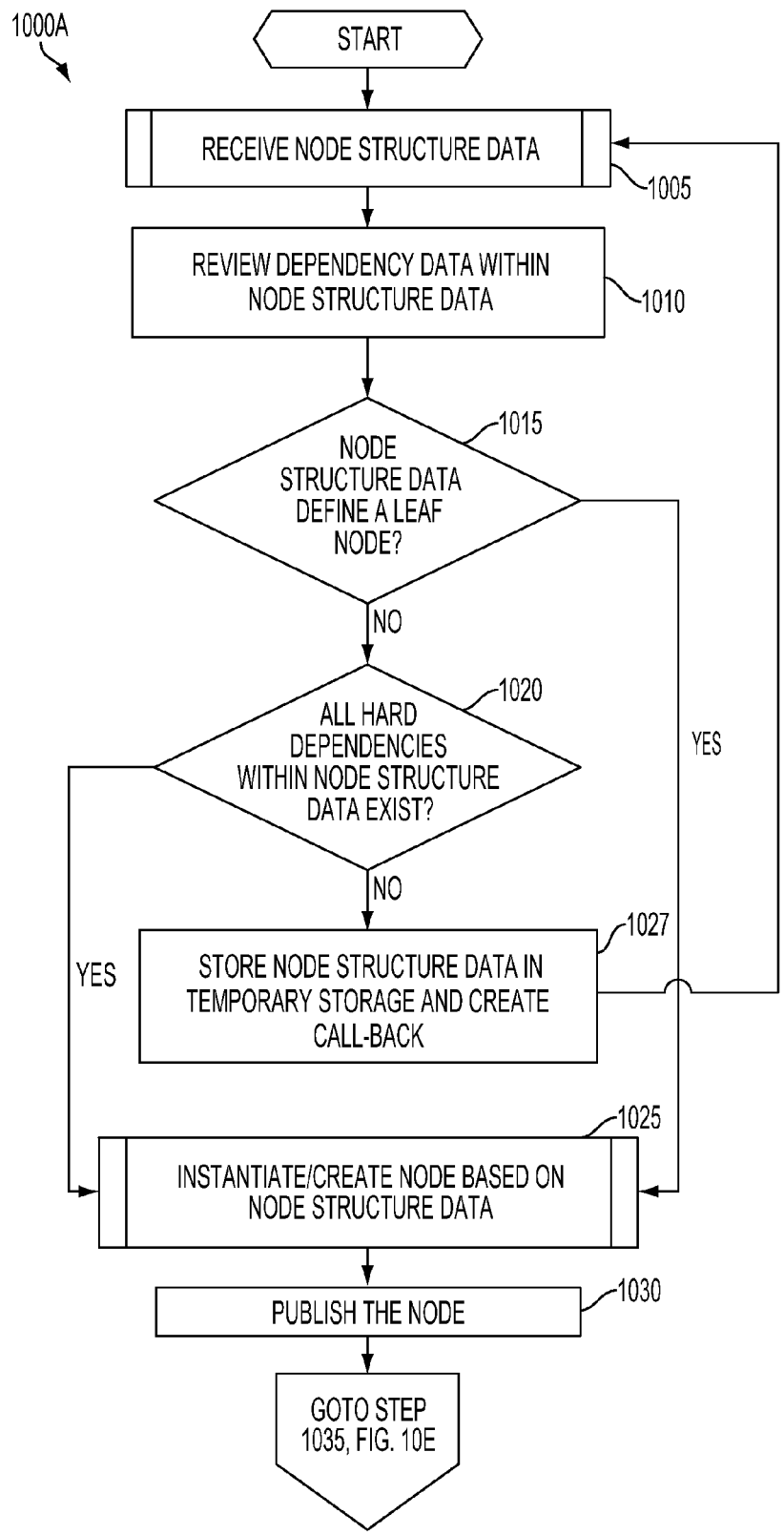
FIG. 10D is a flowchart illustrating a method for creating a node architecture for managing resource(s) of a PCD.

FIG. 10D is a flowchart illustrating a method 1000A for creating a software architecture, such as illustrated in FIG. 4 for managing resource(s) of a PCD 100. Block 1005 is the first routine of the method or process 1000 for managing resources of a PCD 100. In routine block 1005, a routine may be executed or run by the framework manager 440 for receiving node structure data. The node structure data may comprise a dependency array that outlines the dependencies a particular node 601 may have with other nodes 601. Further details about node structure data and this routine or sub-method 705 will be described in more detail below in connection with FIG. 11.

Next, in block 1010, the framework manager 440 may review the dependency data that is part of the node structure data received in block 1005. In decision block 715, the framework manager 440 may determine if the node structure data defines a leaf node 601. A leaf node 601 generally means that the node to be created based on the node structure data does not have any dependencies. If the inquiry to decision block 1015 is positive, meaning that the node structure data for creating the current node does not have any dependencies, then the framework manager 440 continues to routine block 1025.

If the inquiry to decision block 1015 is negative, then the "No" branch is followed to decision block 1020 in which the framework manager determines if all of the hard dependencies within the node structure data exist. A hard dependency may comprise one in which a resource cannot exist without. Meanwhile, a soft dependency may comprise one in which a resource may use the dependent resource as an optional step. A soft dependency means that a node 601 or resource of the node 601 which has a soft dependency may be created or instantiated when the within the node architecture even when the soft dependency does not exist. A marker 650 may be referenced as a soft dependency as described above.

An example of a soft dependency may comprise an optimization feature that is not critical to the operation for a resource oriented 601 containing multiple resources. The framework manager 440 may create or instantiate a node or a resource for all hard dependencies that are present and even when a soft is dependency is not present for those nodes or resources which have soft dependencies that are not created. A call back feature may be used to reference the soft dependency so that when the soft dependency becomes available to the framework manager 440, the framework manager 440 will inform each callback referencing the soft dependency that the soft dependencies are now available.

If the inquiry to decision block 1020 is negative, then the "No" branch is followed to block 1027 in which the node structure data is stored by the framework manager 440 in temporary storage such as memory and the framework manager 440 creates a call back feature associated with this un-instantiated node.

If the inquiry to decision block 1015 is positive, then the "Yes" branch is followed to routine 1025 in which a node 601 is created or instantiated based on the node structure data received in routine block 1005. Further details of routine block 1025 will be described below in connection with FIG. 13. Next, in block 1030, the framework manager 440 publishes the newly created node 601 using its unique resource name(s) so that other nodes 601 may send information to or receive information from the newly created node 601.

Figure 10E:
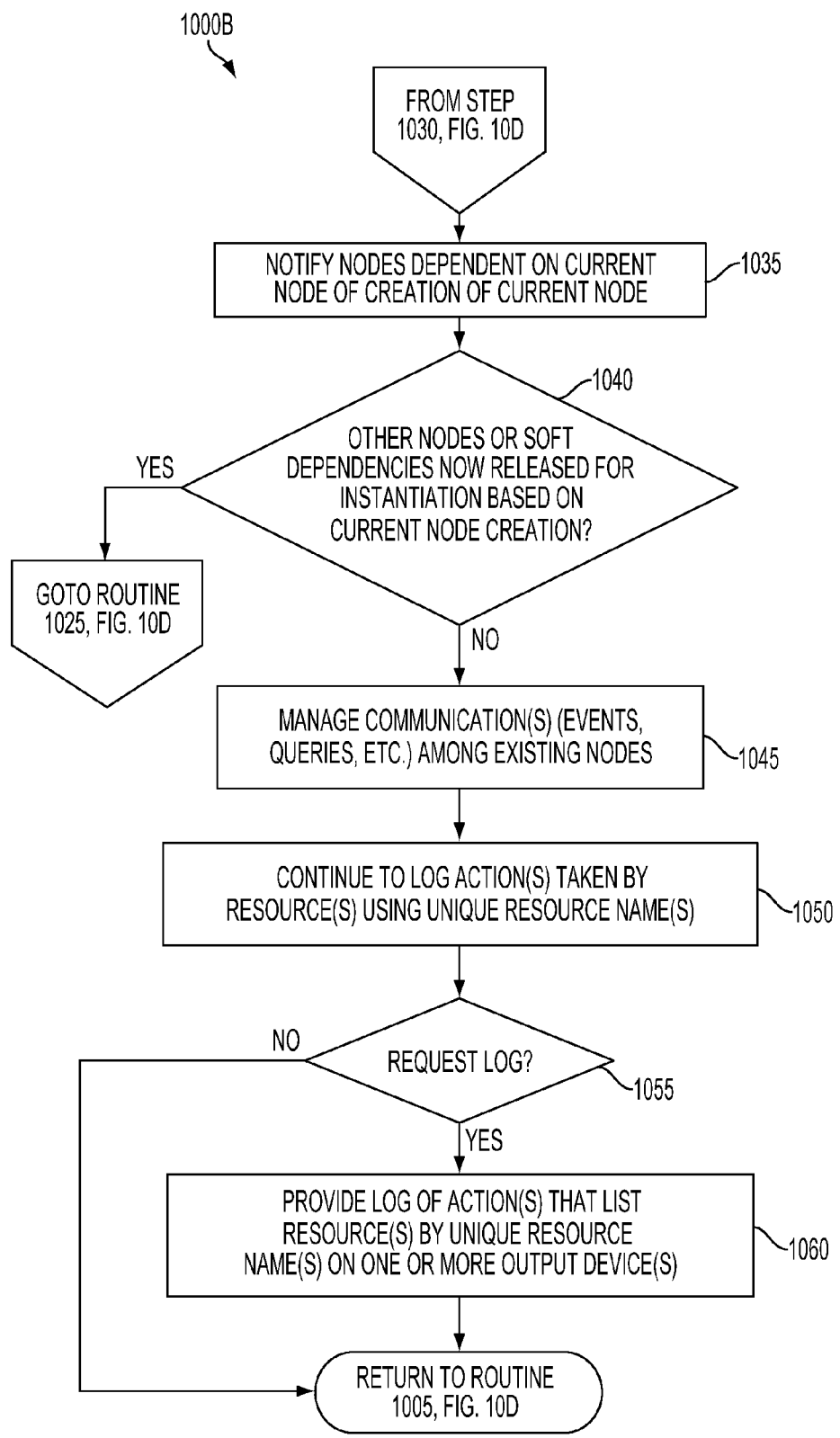
FIG. 10E is a continuation flowchart of FIG. 10D illustrating a method for creating a node architecture for managing resource(s) of a PCD.

Referring now to FIG. 10E which is a continuation flow chart of FIG. 10D, in block 1035, the framework manager 440 notifies other nodes 601 which are dependent on the newly created node 601 that the newly created node 601 has been instantiated and is ready to receive or transmit information. According to one exemplary aspect, notifications are triggered immediately when a dependent node, like node 601B of FIG. 10B, is created, i.e., the notifications are performed recursively. So if node 601B of FIG. 10B is constructed, node 601A is immediately notified. This notification may allow node 601A to be constructed (since node 601B was node 601A's final dependency). Construction of node 601B may cause other nodes 601 to be notified, and so on and so on. Node 601B does not get completed until the final resource dependent on node 601B is completed.

A second, slightly more complex, implementation is to put all of the notifications onto a separate notification queue, and then run through the queue at a single point in time, i.e. the notifications are performed iteratively. So when node 601B of FIG. 10B is constructed, the notification to node 601A is pushed onto a list. Then that list is executed and node 601A gets notified. This causes the notification to other additional nodes 601 (besides node 601A, not illustrated in FIG. 10B) to be put on the same list, and that notification is then sent after the notification to node 601A is sent. The notifications to other nodes 601 (besides the notification to node 601A) doesn't happen until after all the work associated with node 601B and node 601A has been completed.

Logically, these two implementations are exactly equivalent, but they have different memory consumption properties when implemented. The recursive realization is simple but can consume an arbitrary amount of stack space, with the stack consumption being a function of the depth of the dependency graph. The iterative implementation is slightly more complex and requires a bit more static memory (the notification list), but stack usage is constant irrespective of the depth of a dependency graph, such as illustrated in FIG. 10B.

Also, notification of node creation in block 1035 is not limited to other nodes. It may also used internally for alias construction. Any arbitrary element in the system 500 can use the same mechanism to request for notification when a node (or marker) becomes available, not just other nodes. Both nodes and non-nodes may use the same notification mechanism.

In decision block 1040, the framework manager 440 determines if other nodes 601 or soft dependencies are now released for creation or instantiation based on the creation of the current node 601. Decision block 1040 is generally determining if resources may now be created because certain dependency relationships 680 have been fulfilled by the current node which has recently undergone creation or instantiation.

If the inquiry to decision block 1040 is positive, then the "Yes" branch is followed back to routine block 1025 in which the released node 601 may now be created or instantiated because of the fulfillment of a dependency by the node 601 that was just created.

If the inquiry to decision block 1040 is negative, then the "No" branch is followed to block 1045 in which the frame work manager 440 may manage communications between elements of the software architecture as illustrated in FIG. 4. Next, in block 1050, the framework manager 440 may continue to log or record actions taken by resources by using the resource names associated with a particular resource. Block 1045 may be executed by the framework manager 440 after any action taken by the framework manager 440 or any of the elements managed by the framework manager 440, such as the resources, nodes 601, clients 648, events 695, and query functions 697. Block 1045 is yet one important aspect of the node architecture in which the framework manager 440 may maintain a running log of activity that lists actions performed by each element according to their unique identifier or name provided by the authors who created a particular element, such as a resource of a node 601.

Compared to the prior art, this logging of activity in block 1050 that lists unique names assigned to each resource of a system is unique and may provide significant advantages such as used in debugging and error troubleshooting. Another aspect of many that makes the node architecture 500 unique is that separate teams may work on different hardware and/or software elements independently of one another in which each team will be able to use resource names that are unique and easy to track without the need for creating tables to translate less meaningful and usually confusing resource names assigned by other teams and/or the original equipment manufacturer (OEM).

Next, in decision block 1055, the framework manager 440 determines if a log of activity recorded by the framework manager 440 has been requested. If the inquiry to decision block 1055 is negative, then the "No" branch is followed to the end of the process in which the process returns back to routine 1005. If the inquiry to decision block 1055 is positive, then the "Yes" branch is followed to block 1060 in which the framework manager 440 sends the activity log comprising meaningful resource names and respective actions performed by the resource names to an output device, such as a printer or a display screen and/or both. The process then returns to routine block 1005 described above.

Figure 11:
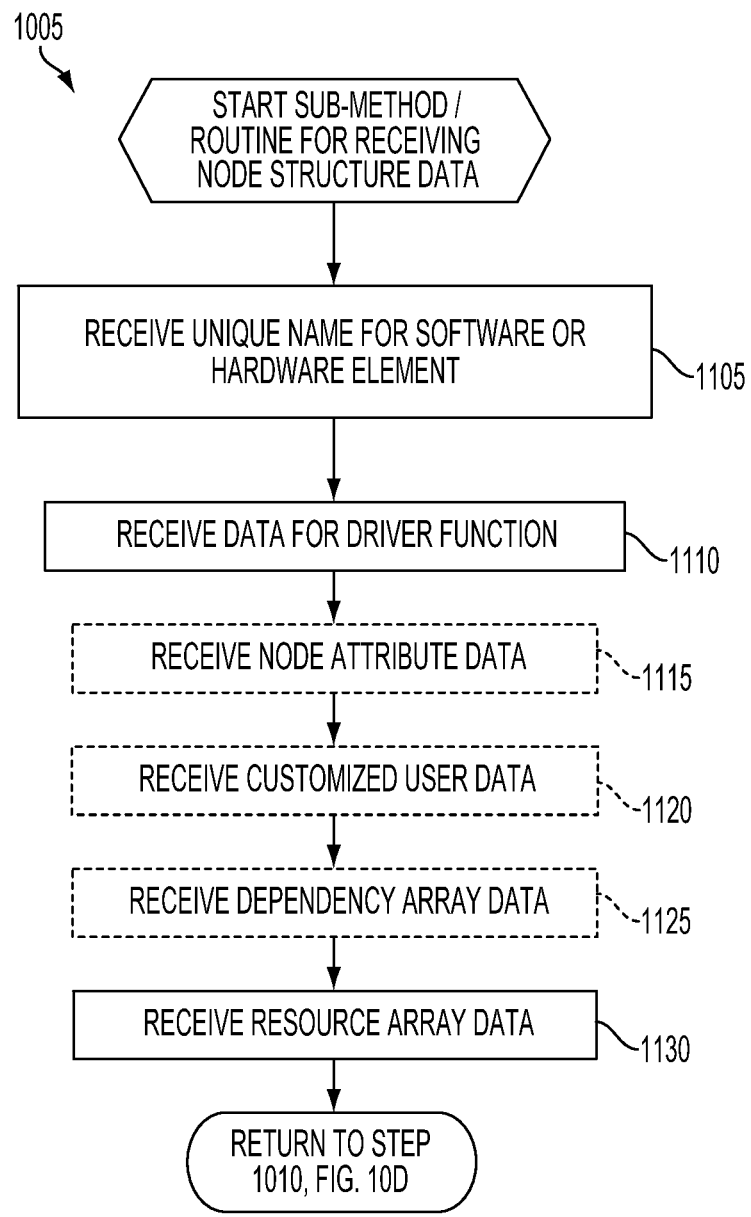
FIG. 11 is a flowchart illustrating a sub-method or a routine of FIG. 10D for receiving node structure data in a software architecture in a PCD.

FIG. 11 is a flowchart illustrating a sub-method or a routine 1005 of FIG. 10D for receiving node structure data in a software architecture of a PCD 100. Block 1105 is the first step in the sub method or routine 1005 of FIG. 10D. In block 1105, the framework manager 440 may receive a unique name for a software or hardware element, such as the CPU 110 and the clock 442 of FIG. 10D. As discussed previously, a node 601 must reference at least one resource. Each resource has a name and that name must be unique in the system 500. All elements within the system 500 may be identified with unique names. Each element has unique name from a character perspective. In other words, generally, there are no two elements within the system 500 which have the same name. According to exemplary aspects of the system, resources of nodes 601 may generally have unique names across the system, but it is not required that client or event names be unique, though they may be unique as desired.

For convenience, a conventional tree file naming structure or file naming "metaphor" that employs forward slash "/" characters for creating unique names may be employed, such as, but not limited to, "/core/cpu" for CPU 110 and "/clk/cpu" for clock 442. However, as recognized by one of ordinary skill the art, other types of resource names containing any other combination of alpha-numeric characters and/or symbols are well within the scope of the invention.

Next, in block 1110, the framework manager 440 may receive data for one or more driver functions associated with one or more resources of the node 601 being created. A driver function generally comprises the action to be completed by one or more resources for a particular node 601. For example, in FIGS. 10A-10B, the driver function for the resource /core/cpu of node 602 may request the amount of bus bandwidth and the CPU clock frequency it requires in order to provide the requested amount of processing that has been requested. These requests would be made via clients (not illustrated) of the resources in nodes 642 and node 622. The driver function for /clk/cpu in node 642 would usually be responsible for actually setting the physical clock frequency in accordance with the request it received from the /core/cpu resource of node 602.

In block 1115, the framework manager 440 may receive node attribute data. The node attribute data generally comprises data that defines the node policies such as security (can the node be accessed via user space applications), remotability (can the node be accessed from other processors in the system) and accessibility (can the resource support multiple concurrent clients). The framework manager 440 may also define attributes that allow a resource to override default framework behavior, such as request evaluation or logging policy.

Subsequently, in block 1120, the framework manager 440 may receive customized user data for the particular node 601 being created. The user data may comprise a void "star" field as understood by one of ordinary skill in the art with respect to the "C" programming language. User data is also known to one of ordinary skill in the art as a "trust me" field. Exemplary customized user data may include, but is not limited to, tables such as frequency tables, register maps, etc. The user data received in block 1120 is not referenced by the system 500, but allows for customization of a resource if the customization is not recognized or fully supported by the framework manager 440. This user data structure is a base class in the "C" programming language intended to be extended for particular or specific uses.

One of ordinary skill the art recognizes that other kinds of data structures for extending specific uses of a particular class are within the scope of the invention. For example, in the programming language of "C++" (C-plus-plus), an equivalent structure may comprise the key word "public" which would become an extension mechanism for a resource within a node 601.

Next, in block 1125, the framework manager 440 may receive dependency array data. The dependency array data may comprise the unique and specific names of one or more resources 601 on which the node 601 being created is dependent. For example, if the first node 602 of FIG. 10C was being created, then in this block 1125, the dependency array data may comprise the resource names of the three resources of the second node 622 and the single resource name of the third node 642 on which the first node 602 is dependent.

Subsequently, in block 1130, the framework manager 440 may receive resource array data. The resource array data may comprise parameters for the current node being created, such as parameters relevant to the first node 602 of FIGS. 10B-10C if this first node 602 was being created. The resource array data may comprise one or more of the following data: the names of other resources; unit; maximum value; resource attributes; plug-in data; and any customized resource data similar to the customize user data of block 1120. The plug-in data generally identifies functions retrieved from a software library and usually lists the client types that may be supported by the particular node or plurality of nodes being created. The plugin data also allows for customization of client creation and destruction. After block 1130, the process returns to block 1010 of FIG. 10D.

In FIG. 11, the attribute data block 1115, customize user data block 1120, and the dependency array data block 1125 have been illustrated with dashed lines to indicate that these particular steps are optional and not required for any given node 601. Meanwhile the unique name block 1105, a driver function block 1110, and resource array data block 1130 have been illustrated with solid lines to indicate that these steps of routine 1005 are generally mandatory for creating a node 601.

Figure 12:
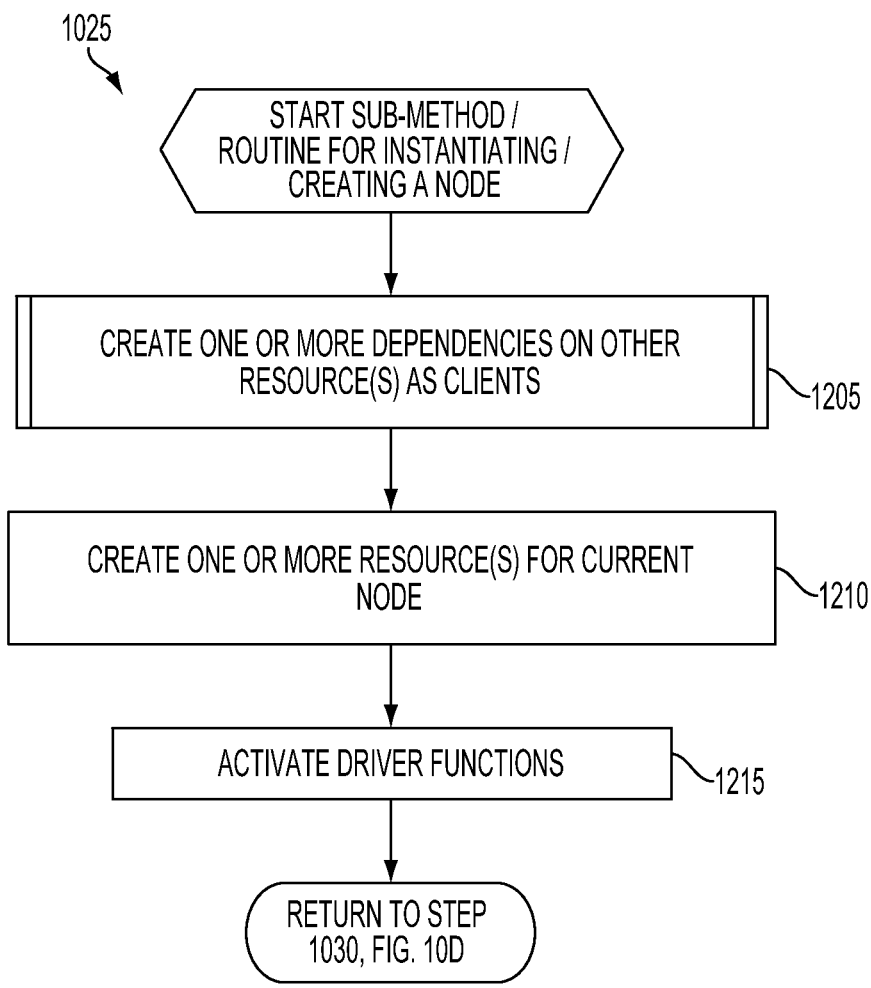
FIG. 12 is a flowchart illustrating a sub-method or a routine of FIGS. 10D-10E for creating a node in a software architecture for a PCD.

FIG. 12 is a flowchart illustrating a sub-method or a routine 1025 of FIG. 10D for creating a node in a software architecture for a PCD 100. Routine Block 1205 is the first routine in the sub-method or routine 1025 for instantiating or creating a node 601 according to one exemplary embodiment. In routine block 1205, one or more clients 648 that are associated with the node 601 being instantiated are created in this step. Further details about routine block 1205 will be described in further detail below in connection with FIG. 13.

In block 1210, the framework manager may create or instantiate the one or more resources corresponding to the node structure data of block 705. Next, in block 1215, the framework manager 440 may activate the driver functions received in routine block 1110 of routine block 1005. According to one exemplary aspect, the driver functions may be activated using the maximum values received in the resource array data block 1130 of routine block 1005. According to another, preferred, exemplary aspect, each driver function may be activated with an optional, initial value that is passed along with the node structure data from routine 1005. If initial data is not provided, the driver function is initialized at 0—the minimum value. The driver function is also usually activated in manner such that it is known that it is being initialized. This enables the resource to perform any operations that are specific to initialization, but do not need to be performed during normal or routine operation. The process then returns to step 1030 of FIG. 10D.

Figure 13:
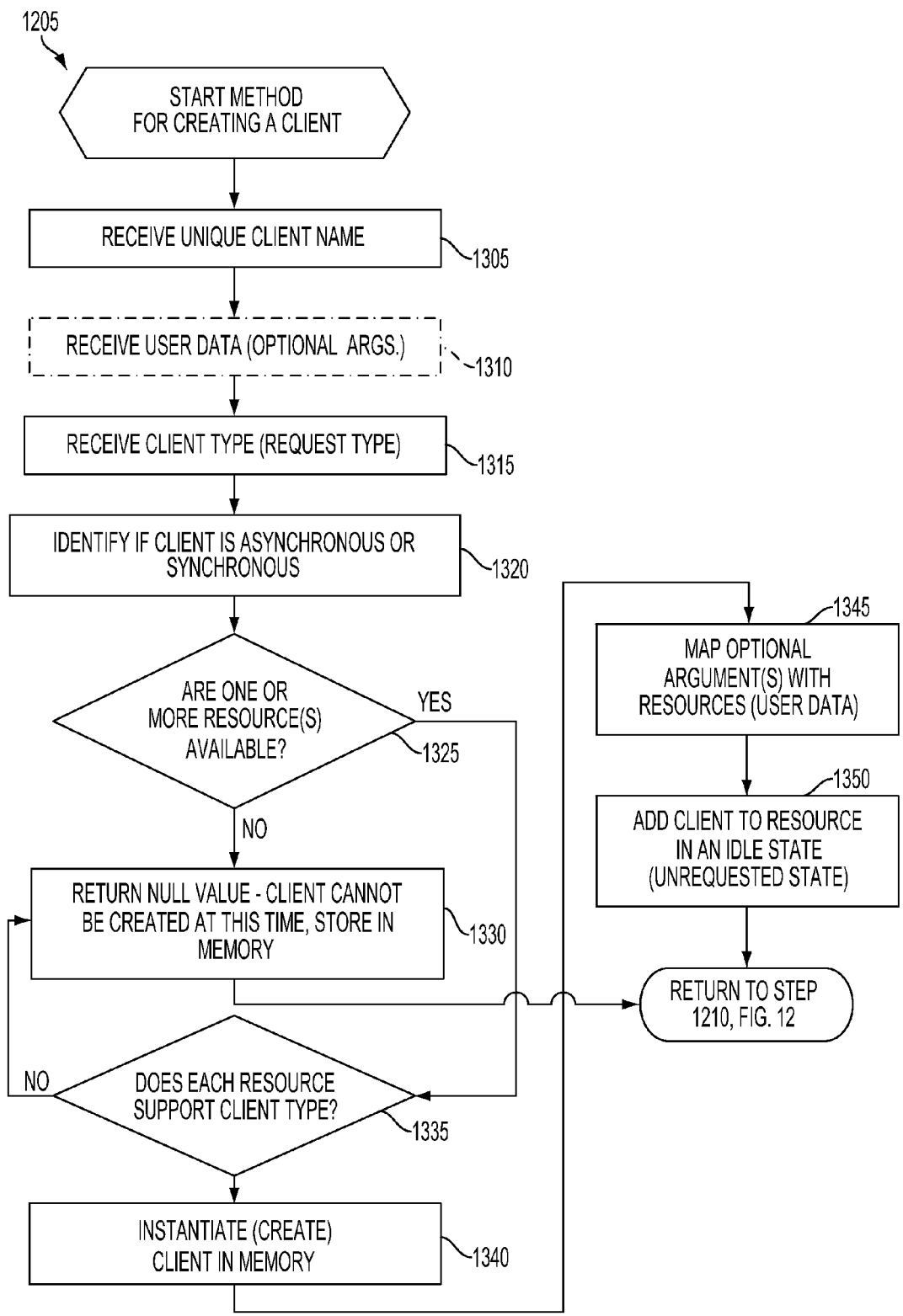
FIG. 13 is a flowchart illustrating a sub-method or a routine of FIG. 12 for creating a client in a software architecture of a PCD.

FIG. 13 is a flowchart illustrating a sub-method or a routine 1205 of FIG. 12 for creating a client 648 in a software architecture of a PCD 100. Block 1305 is the first step of routine block 1205 in which a client 648 of one or more resources 601 is created. In block 1205, the framework manager 440 receives a name assigned to the client 648 being created. Similar to resource names, the name for a client 648 may comprise any type of alphanumeric and/or symbols.

Next, in block 1310, customized user data may be received by the framework manager 440 if there are any particular customizations for this client 648 being created. Block 1310 has been illustrated with dashed lines to indicate that the step is optional. The customized user data of block 1310 is similar to the customized user data discussed above in connection with the creation of resources for nodes 601.

In block 1315, the framework manager 440 receives the client type category assigned to the particular client being created. The client type category as of this writing may comprise one of four types: (a) required, (b) impulse, (c) vector, and (d) isochronous. The client type category list may be expanded depending upon the resources being managed by the system 101 and upon the application programs relying upon the resources of the nodes 601.

The required category generally corresponds with the processing of a scalar value that is passed from the required client 648 to a particular resource 601. For example, a required request may comprise a certain number of millions of instructions per second (MIPs). Meanwhile, the impulse category generally corresponds with the processing of a request to complete some activity within a certain period of time without any designation of a start time or stop time.

An isochronous category generally corresponds with a request for an action that is typically reoccurring and has a well-defined start time and a well-defined end time. A vector category generally corresponds with an array of data that usually is part of multiple actions that are required in series or in parallel.

Subsequently, in block 1320, the framework manager 440 receives data that indicates whether the client 648 has been designated as synchronous or asynchronous. A synchronous client 648 is one that typically requires the framework manager 442 lock a resource of a node 601 until the resource 601 returns data and an indication that the resource 601 has finished completing the requested task from the synchronous client 648.

On the other hand, an asynchronous client 648 may be handled by one or more threads 436 (See FIG. 4) in parallel which are accessed by the framework manager 440. The framework 440 may create a callback to a thread 436 and may return a value when the callback has been executed by a respective thread 436. One of ordinary skill the art recognizes that the asynchronous client 648 does not lock up a resource like a synchronous client 648 does when the task of the synchronous client 648 is being executed.

After block 1320, in decision block 1325, the framework manager 440 determines if the resource identified by the client 645 are available. If the inquiry to decision block 1325 is negative, then the "No" branch is followed to block 1330 in which a null value or message is returned to a user indicating that the client 648 cannot be created at this time.

If the inquiry to decision block 1325 is positive, then the "Yes" branch is followed to decision block 1335 in which the framework manager 440 determines if each resource identified by the client 648 supports the client type provided in block 1310. If the inquiry to decision block 1335 is negative, then the "No" branch is followed back to block 1330 in which a null value or message is returned indicating that the client 648 cannot be created at this time.

If the inquiry to decision block 1335 is positive, then the "Yes" branch is followed to block 1340 in which the framework manager 440 creates or instantiates the client 648 in memory. Next, in block 1345, if any customized user data is received in block 1310, such as optional arguments, then these optional arguments may be mapped with their respective resources a particular nodes 601. Next, in block 1350, the newly created client 645 is coupled to its corresponding one or more resources in an idle state or on requested state as illustrated in FIG. 10C described above. The process then returns to block 1210 of FIG. 12.

Figure 14:
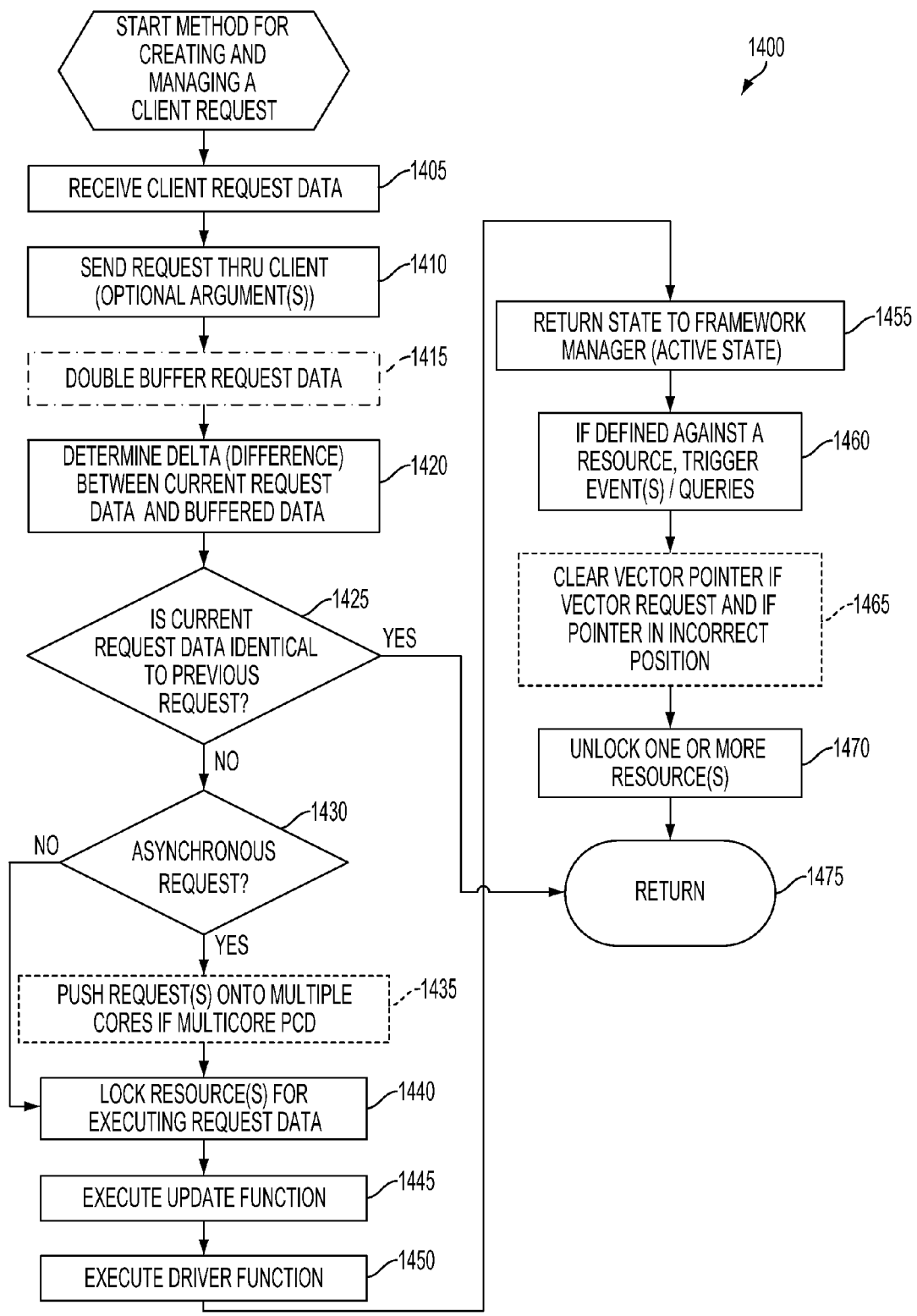
FIG. 14 is a flow chart illustrating a method for creating a client request against a resource in a software architecture for a PCD.

FIG. 14 is a flow chart illustrating a method 1400 for creating a client request 675 against a resource 601 in a software architecture for a PCD 100. The method 1400 is generally executed after client creation and node creation as described above in connection with FIGS. 10D-E and FIG. 13.

Block 1405 is the first step in the method 1400 for creating a client request 675 against the resource 601. This method 1400 will describe how the following three types of requests 675 are handled by the framework manager 440: (a) required, (b) impulse, and (c) vector. As the names of the requests 675 mentioned above suggest, client requests 675 generally correspond with client types that were created and described above in connection with FIG. 14.

In block 1405, the framework manager 440 may receive the data associated with a particular client request 675 such as one of the three mentioned above: (a) required, (b) impulse, and (c) vector. The data associated with a required request generally comprises a scalar value that is passed from the required client 648 to a particular resource 601. For example, a required request may comprise a certain number of millions of instructions per second (MIPs). Meanwhile, an impulse request comprises a request to complete some activity within a certain period of time without any designation of a start time or stop time. Data for a vector request generally comprises an array of multiple actions that are required to be completed in series or in parallel. A vector request may comprise an arbitrary length of values. A vector request usually has a size value and an array of values. Each resource of a node 601 may be extended to have a pointer field in order to support a vector request. In the "C" programming language, the pointer field is supported by the union function as understood by one of ordinary skill in the art.

Next, in block 1410, the framework manager 440 issues the request through the client 648 that was created by the method described above in connection with FIG. 13. Subsequently, in block 1415, the framework manager 440 double buffers the request data being passed through the client if the request is a required type or a vector type. If the request is an impulse type, then block 1415 is skipped by the framework manager 440.

For required requests, in this block 1415, values from a prior request are maintained in memory so that the framework manager 440 can determine if there is any difference between the previous requested values in the current set of requested values. For vector requests, prior requests are usually not maintained in memory, although a resource of a node 601 may maintain it as desired for a particular implementation. Therefore, block 1415 is optional for vector types of requests.

In block 1420, the framework manager 440 calculates the delta or difference between the previous set of requested values in the current set of requested values. In decision block 1425, the framework manager determines if the current set of requested values is identical to the previous set of requested values. In other words, the framework manager 440 determines if a difference exists between the current set of requested values and the previous set of requested values. If there is no difference between the current set and previous set of requested values, then the "Yes" branch is followed (which skips blocks 1430 through block 1470) to block 1475 in which the process ends.

If the inquiry to decision block 1425 is negative, meaning that the set of requested values are different relative to the set of pre-previous requested values, then the "No" branch is followed to decision block 1430.

In decision block 1430, the framework manager 440 determines if the current request is an asynchronous request. If the inquiry to decision block 1430 is negative, then the "No" branch is followed to block 1440 in which the resource 601 corresponding to the client request 675 is locked by the framework manager 440. If the inquiry to decision block 1430 is positive, meaning that the current request is asynchronous request type, then the "Yes" branch is followed to block 1435 in which the request may be pushed onto another thread and may be executed by another core if a multicore system, like that of FIG. 1, is currently managed by the framework manager 440. Block 1435 has been illustrated with dashed lines to indicate that this step may be optional if the PCD 100 is a single core central processing system.

Subsequently, in block 1440, the resources 601 corresponding to the request 675 is locked by the framework manager 440. Next, in block 1445, the resource 601 executes the update function which generally corresponds to the plug-in data of the resource array data received in block 1130 of FIG. 11. The update function generally comprises a function responsible for the new resource state in light of a new client request. The update function compares its previous state with the requested state in the client request. If the requested state is greater than the previous state, then the update function will perform the client request. However, if the requested state is equal to or less than the current state and which the resource is operating at, then the client request will not be performed in order to increase the efficiency since the old state achieves or satisfies the requested state. An update function takes a new request from the client and aggregates it with all the other active requests to determine the new state for the resource.

As an example, multiple clients may be requesting a bus clock frequency. The update function for the bus clock would usually take the maximum of all the client requests and use that as the new desired state for the bus clock. It is not the case that all resources will use the same update function, although there are some update functions that will be used by multiple resources. Some common update functions are to take the maximum of client requests, to take the minimum of client requests and to sum the client request. Or resources may define their own custom update function if their resource needs to aggregate requests in some unique way.

Next, in block 1450, the framework manager 440 passes the data to the resource corresponding to the client 648 so that the resource may execute the driver function which is specific to the resource of a node 601. A driver function applies the resource state as computed by the update function. This may entail updating hardware settings, issuing requests to dependent resources, calling legacy functions or some combination of the above.

In the previous example, the update function computed the requested bus clock frequency. The driver function may receive that requested frequency and it may update the clock frequency control HW to run at that frequency. Note that sometimes it is not possible for the driver function to meet the exact requested state that update function has computed. In this case, the driver function may choose the frequency that best meets the request. For example, the bus clock HW may only be able to run at 128 MHz and 160 MHz, but the requested state might be 150 MHz. In this case, the driver function should run at 160 MHz, as that exceeds the requested state.

Next, in block 1455, the framework 440 receives state control from the resource which have executed the driver function in block 1450. Subsequently, in block 1460, if defined against the resource, events 690 may be triggered so that data is passed back to the client 648 which corresponds to the event 690. Events may be processed in another thread. This may minimize the amount of time spent with the resources locked and allows for more parallel operation in a multicore system as illustrated in FIG. 1. One or more events 690 may be defined against a resource in a manner similar to how a request may be defined against a resource as described in this method 1400. In other words, the event creation process may largely parallel the client creation process. One thing that is different with the events is that it is possible to define events that only get triggered when certain thresholds are crossed.

This defining of events that only get triggered based on thresholds allows for notification of when a resource is getting oversubscribed (it has more concurrent users than it can support) which is indicative of a system overloading condition, or when a resource goes low/off, which may allow other things to be shut off, restore functionality that was disabled when the system became oversubcscribed, etc. Because the event registration may be done with thresholds, it reduces the amount of work the system has to do on event notification to only happen when there is something really necessary. It is also possible to register for an event on every state change.

Next, in optional block 1465, if the request being processed is a vector request, then this optional block 1465 is usually performed. Optional block 1465 generally comprises a check or determination to assess whether the vector pointer is still positioned on the same data that the user passed into the vector. If the inquiry to this optional block 1465 is positive, meaning that the pointer is still pointing to the same data which was passed by the user into the vector, then the pointer is cleared out so that references to old data is not maintained. This optional block 1465 is generally performed to account for the double buffering block 1415 described above when a vector request is being processed, compared to an impulse request and a required request.

Subsequently, in block 1470, the framework 440 unlocks the requested resource so that other client requests 648 may be handled by the current but now released requested resource of a particular node 601. The process then returns to the first block 1405 for receiving the next client request.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGs. which may illustrate various process flows.

In one or more exemplary aspects, the functions described may be implemented in hardware, software, firmware, or any combination thereof If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for dynamically creating and servicing master-slave pairs within and across switch fabrics of a portable computing device, comprising:
    receiving a client request comprising a master-slave pair;
    conducting a search for a slave corresponding to the master-slave pair;
    creating a route for communications corresponding to the master-slave pair;
    storing one or more handles in a memory device that correspond to the route;
    setting bandwidth of the route, wherein setting the bandwidth of the route further comprises converting parameters of the client request into instantaneous bandwidth (Ib) and average bandwidth (Ab) values, wherein the average bandwidth (Ab) is calculated from the summation of all client requests within and across switch fabrics corresponding to the created route and the instantaneous bandwidth is calculated from the maximum of all client requests within and across switch fabrics corresponding to the created route; and
    processing the client request using the created route and after the bandwidth of the route is set.

2. The method of claim 1, wherein conducting the search for the slave comprises comparing unique identifiers assigned to each slave in a master-slave hierarchy.

3. The method of claim 1, wherein conducting the search for the slave comprises reviewing a fabric route check table for slaves that can be interrogated within a switch fabric.

4. The method of claim 1, wherein conducting the search for the slave comprises searching across one or more different switch fabrics of the PCD.

5. The method of claim 1, further comprising utilizing a node architecture to track communications in which each master is represented by a node and each slave is represented by a node.

6. The method of claim 1, wherein the instantaneous bandwidth (Ib) is determined by the following equation:

$$Ib=BS/W$$

where "BS" is block size expressed in number of bytes, and "W" is window size expressed in units of time.

7. The method of claim 1, wherein the average bandwidth (Ab) is determined by the following equation:

$$Ab=BS/P$$

where "BS" is block size expressed in number of bytes, and "P" is period expressed in units of time.

8. The method of claim 1, wherein the average bandwidth (Ab) is determined by the following equation:

$$Ab=T\times(Z\%)$$

where "Ab" is average bandwidth; where "T" is the desired clock speed of a central processing unit issuing a software request; and "Z %" is a percentage of at least one of use and a percentage of cache misses.

9. A computer system for dynamically creating and servicing master-slave pairs within and across switch fabrics of a portable computing device, the system comprising:
    a processor operable for:
        receiving a client request comprising a master-slave pair;
        conducting a search for a slave corresponding to the master-slave pair;
        creating a route for communications corresponding to the master-slave pair;
        storing one or more handles in a memory device that correspond to the route;
        setting bandwidth of the route, wherein setting the bandwidth of the route further comprises converting parameters of the client request into instantaneous bandwidth (Ib) and average bandwidth (Ab) values, wherein the average bandwidth (Ab) is calculated from the summation of all client requests within and across switch fabrics corresponding to the created route and the instantaneous bandwidth is calculated from the maximum of all client requests within and across switch fabrics corresponding to the created route; and
        processing the client request using the created route and after the bandwidth of the route is set.

10. The system of claim 9, wherein conducting the search for the slave comprises comparing unique identifiers assigned to each slave in a master-slave hierarchy.

11. The system of claim 9, wherein conducting the search for the slave comprises reviewing a fabric route check table for slaves that can be interrogated within a switch fabric.

12. The system of claim 9, wherein conducting the search for the slave comprises searching across one or more different switch fabrics of the PCD.

13. The system of claim 9, wherein the processor is further operable for utilizing a node architecture to track communications in which each master is represented by a node and each slave is represented by a node.

14. The system of claim 9, wherein the instantaneous bandwidth (Ib) is determined by the following equation:

$$Ib=BS/W$$

where "BS" is block size expressed in number of bytes, and "W" is window size expressed in units of time.

15. The system of claim 9, wherein the average bandwidth (Ab) is determined by the following equation:

$$Ab=BS/P$$

where "BS" is block size expressed in number of bytes, and "P" is period expressed in units of time.

16. The system of claim 9, wherein the average bandwidth (Ab) is determined by the following equation:

$$Ab=T\times(Z\%)$$

where "Ab" is average bandwidth; where "T" is the desired clock speed of a central processing unit issuing a software request; and "Z %" is a percentage of at least one of use and a percentage of cache misses.

17. A computer system for dynamically creating and servicing master-slave pairs within and across switch fabrics of a portable computing device, the system comprising:
   means for receiving a client request comprising a master-slave pair;
   means for conducting a search for a slave corresponding to the master-slave pair;
   means for creating a route for communications corresponding to the master-slave pair;
   means for storing one or more handles in a memory device that correspond to the route;
   means for setting bandwidth of the route, wherein said means for setting the bandwidth of the route further comprises means for converting parameters of the client request into instantaneous bandwidth (Ib) and average bandwidth (Ab) values, wherein the average bandwidth (Ab) is calculated from the summation of all client requests within and across switch fabrics corresponding to the created route and the instantaneous bandwidth is calculated from the maximum of all client requests within and across switch fabrics corresponding to the created route; and
   means for processing the client request using the created route and after the bandwidth of the route is set.

18. The system of claim 17, wherein the means for conducting the search for the slave further comprises means for comparing unique identifiers assigned to each slave in a master-slave hierarchy.

19. The system of claim 17, wherein the means for conducting the search for the slave further comprises means for reviewing a fabric route check table for slaves that can be interrogated within a switch fabric.

20. The system of claim 17, wherein the means for conducting the search for the slave further comprises searching across one or more different switch fabrics of the PCD.

21. The system of claim 17, further comprising means for utilizing a node architecture to track communications in which each master is represented by a node and each slave is represented by a node.

22. The system of claim 17, wherein the instantaneous bandwidth (Ib) is determined by the following equation:

$$Ib=BS/W$$

where "BS" is block size expressed in number of bytes, and "W" is window size expressed in units of time.

23. The system of claim 17, wherein the average bandwidth (Ab) is determined by the following equation:

$$Ab=BS/P$$

where "BS" is block size expressed in number of bytes, and "P" is period expressed in units of time.

24. The system of claim 17, wherein the average bandwidth (Ab) is determined by the following equation:

$$Ab=T\times(Z\%)$$

where "Ab" is average bandwidth; where "T" is the desired clock speed of a central processing unit issuing a software request; and "Z %" is a percentage of at least one of use and a percentage of cache misses.

25. A computer program product comprising a computer usable device having a computer readable program code embodied therein, said computer readable program code adapted to be executed to implement a method for creating and servicing master-slave pairs within and across switch fabrics of a portable computing device, said method comprising:
   conducting a search for a slave corresponding to the master-slave pair;
   creating a route for communications corresponding to the master-slave pair;
   storing one or more handles in a memory device that correspond to the route;
   setting bandwidth of the route, wherein setting the bandwidth of the route further comprises converting parameters of the client request into instantaneous bandwidth (Ib) and average bandwidth (Ab) values, wherein the average bandwidth (Ab) is calculated from the summation of all client requests within and across switch fabrics corresponding to the created route and the instantaneous bandwidth is calculated from the maximum of all client requests within and across switch fabrics corresponding to the created route; and
   processing the client request using the created route and after the bandwidth of the route is set.

26. The computer program product of claim 25, wherein conducting the search for the slave comprises comparing unique identifiers assigned to each slave in a master-slave hierarchy.

27. The computer program product of claim 25, wherein conducting the search for the slave comprises reviewing a fabric route check table for slaves that can be interrogated within a switch fabric.

28. The computer program product of claim 25, wherein conducting the search for the slave comprises searching across one or more different switch fabrics of the PCD.

29. The computer program product of claim 25, wherein the program code implementing the method further comprises:
   utilizing a node architecture to track communications in which each master is represented by a node and each slave is represented by a node.

30. The computer program product of claim 25, wherein the instantaneous bandwidth (Ib) is determined by the following equation:

$$Ib=BS/W$$

where "BS" is block size expressed in number of bytes, and "W" is window size expressed in units of time.

31. The computer program product of claim 25, wherein the average bandwidth (Ab) is determined by the following equation:

$$Ab=BS/P$$

where "BS" is block size expressed in number of bytes, and "P" is period expressed in units of time.

32. The computer program product of claim 25, wherein the average bandwidth (Ab) is determined by the following equation:

$$Ab = T \times (Z\%)$$

where "Ab" is average bandwidth; where "T" is the desired clock speed of a central processing unit issuing a software request; and "Z %" is a percentage of at least one of use and a percentage of cache misses.

* * * * *

UNITED STATES PATENT AND TRADEMARK OFFICE
CERTIFICATE OF CORRECTION

| | | Page 1 of 1 |
|---|---|---|
| PATENT NO. | : 8,595,366 B2 | |
| APPLICATION NO. | : 13/101937 | |
| DATED | : November 26, 2013 | |
| INVENTOR(S) | : Purandar Mukundan et al. | |

It is certified that error appears in the above-identified patent and that said Letters Patent is hereby corrected as shown below:

In the Drawings
    Sheet 8, Fig. 9A, the ratio of "BLACKSIZE/WINDOWSIZE" should be changed to --BLOCKSIZE/WINDOWSIZE--.

In the Specification
    Column 7, lines 46-47, the phrase, "the first Master 1 110A" should be changed to --the first Master (M1) 110A--.
    Column 7, line 47, the phrase, "the first Slave 1 111" should be changed to --the first Slave (S1) 111--.
    Column 7, lines 47-48, the phrase, "the second Slave 2 112" should be changed to --the second Slave (S2) 112-- and the phrase, "the second Master 2 110B" should be changed to --the second Master (M2) 110B--.
    Column 7, line 49, the phrase, "the first Slave 1 111 and the second Slave 2 112" should be changed to --the first Slave (S1) 111 and the second Slave(S2) 112--.
    Column 8, line 11, the phrase, "The first switch fabric 107" should be changed to --The first switch fabric 107A--.
    Column 11, line 48, the phrase, "the next which fabric 107" should be changed to --the next switch fabric 107--.
    Column 16, line 61, the phrase, "second at 622" should be changed to --second node 622--.
    Column 18, line 63, the phrase, "In decision block 715" should be changed to --In decision block 1015--.
    Column 23, lines 44-45, the phrase, "the framework manager 442 lock" should be changed to --the framework manager 440 to lock--.

Signed and Sealed this
Eleventh Day of March, 2014

Michelle K. Lee
*Deputy Director of the United States Patent and Trademark Office*